(12) United States Patent
Miyoshi et al.

(10) Patent No.: US 7,903,754 B2
(45) Date of Patent: Mar. 8, 2011

(54) RADIO COMMUNICATION METHOD, RADIO TRANSMITTING APPARATUS, AND RADIO RECEIVING APPARATUS

(75) Inventors: Kenichi Miyoshi, Yokohama (JP); Atsushi Matsumoto, Kanazawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/060,725

(22) Filed: Apr. 1, 2008

(65) Prior Publication Data
US 2008/0212705 A1 Sep. 4, 2008

Related U.S. Application Data

(63) Continuation of application No. 10/477,553, filed as application No. PCT/JP03/02176 on Feb. 27, 2003, now Pat. No. 7,372,908.

(30) Foreign Application Priority Data

Feb. 28, 2002 (JP) .................................. 2002-052831

(51) Int. Cl.
*H04B 7/02* (2006.01)
(52) U.S. Cl. ...................................... 375/267
(58) Field of Classification Search .................. 375/260, 375/267, 269, 272, 273, 275, 279, 283, 335, 375/341, 347, 349
See application file for complete search history.

(56) References Cited

U.S. PATENT DOCUMENTS

| | | | | |
|---|---|---|---|---|
| 5,504,783 | A * | 4/1996 | Tomisato et al. | ............. 375/267 |
| 5,612,948 | A | 3/1997 | Fette | |
| 6,400,750 | B1 | 6/2002 | Lee | |
| 6,430,401 | B1 * | 8/2002 | Lou et al. | ...................... 455/108 |
| 6,967,997 | B2 | 11/2005 | Humphrey | |
| 6,973,118 | B1 | 12/2005 | Ikeda | |
| 2001/0028637 | A1 | 10/2001 | Abeta | |
| 2003/0095587 | A1 * | 5/2003 | Schilling | ....................... 375/143 |
| 2003/0103584 | A1 | 6/2003 | Bjerke | |
| 2003/0112744 | A1 | 6/2003 | Baum | |

FOREIGN PATENT DOCUMENTS

| | | |
|---|---|---|
| EP | 0 854 619 | 7/1998 |
| JP | 11266224 | 9/1999 |
| JP | 2000312194 | 11/2000 |
| JP | 2002009735 | 1/2002 |

(Continued)

OTHER PUBLICATIONS

Japanese Office Action dated Dec. 26, 2006 with English translation.

(Continued)

*Primary Examiner* — Chieh M. Fan
*Assistant Examiner* — Freshteh N. Aghdam
(74) *Attorney, Agent, or Firm* — Dickinson Wright PLLC

(57) ABSTRACT

A duplicating section duplicates a bit sequence to be input, and a 16QAM section modulates a bit sequence of a duplicating source to form a symbol, a 16QAM section modulates the duplicated bit sequence to form a symbol, an S/P section parallel converts the symbol sequence input in series, an S/P section parallel converts the symbol sequence input in series, and an IFFT section 15 provides IFFT processing to the input symbol sequence. Since each of multiple same bits duplicated by the duplicating section is included in a different symbol, each of the multiple same bits is allocated to each of multiple subcarriers each having a different frequency by IFFT processing. As a result, a multicarrier signal including the multiple same bits each having a different frequency is generated.

5 Claims, 22 Drawing Sheets

FOREIGN PATENT DOCUMENTS

WO          01/10048        2/2001

OTHER PUBLICATIONS

PCT International Search Report dated May 6, 2003.

TSG-RAN Working Group 1 HSDPA AdHoc; "Comparison of HARQ Schemes for 16-QAM," TSGR1#(01)1059, Sophia Antipolis, France, Nov. 5-7, 2001, Source: Panasonic, pp. 1-12.

Supplementary European Search Report dated Aug. 31, 2010.

* cited by examiner

MAPPING INFORMATION 1

MAPPING INFORMATION 2

RADIO COMMUNICATION METHOD, RADIO TRANSMITTING APPARATUS, AND RADIO RECEIVING APPARATUS

This application is a continuation of U.S. application Ser. No. 10/477,553 filed Nov. 13, 2003 now U.S. Pat. No. 7,372,908, which is a 35 USC 371 application of PCT/JP2003/002176 filed Feb. 27, 2003, which is based on JP 2002-052831 filed Feb. 28, 2002, the contents of which are incorporated by reference herein in their entireties.

TECHNICAL FIELD

The present invention relates to a radio communication method, radio transmitting apparatus and radio receiving apparatus.

BACKGROUND ART

Conventionally, in radio communications, to improve reception quality, there are performed an antenna diversity transmission that switches an antenna to transmit the same signal and an automatic repeat request that retransmits a signal according to a request from a receiving side when an error occurs in the signal. However, in the antenna diversity transmission, since multiple antennas must be prepared, an apparatus scale on a transmitting side will be increased. Additionally, in the automatic repeat request, the frequency of retransmission will increase as an error rate is high, resulting in a reduction transmission efficiency.

DISCLOSURE OF INVENTION

An object of the present invention is to provide a radio communication method, radio transmitting apparatus and radio receiving apparatus that is capable of improving reception quality without performing transmission and retransmission using a plurality of antennas.

In order to attain the above object, the present invention transmits a multicarrier signal including a plurality of same bits each having a different frequency.

BEST MODE FOR CARRYING OUT THE INVENTION

The following will specifically explain embodiments of the present invention with reference to the drawings.

Embodiment 1

Figure 1:
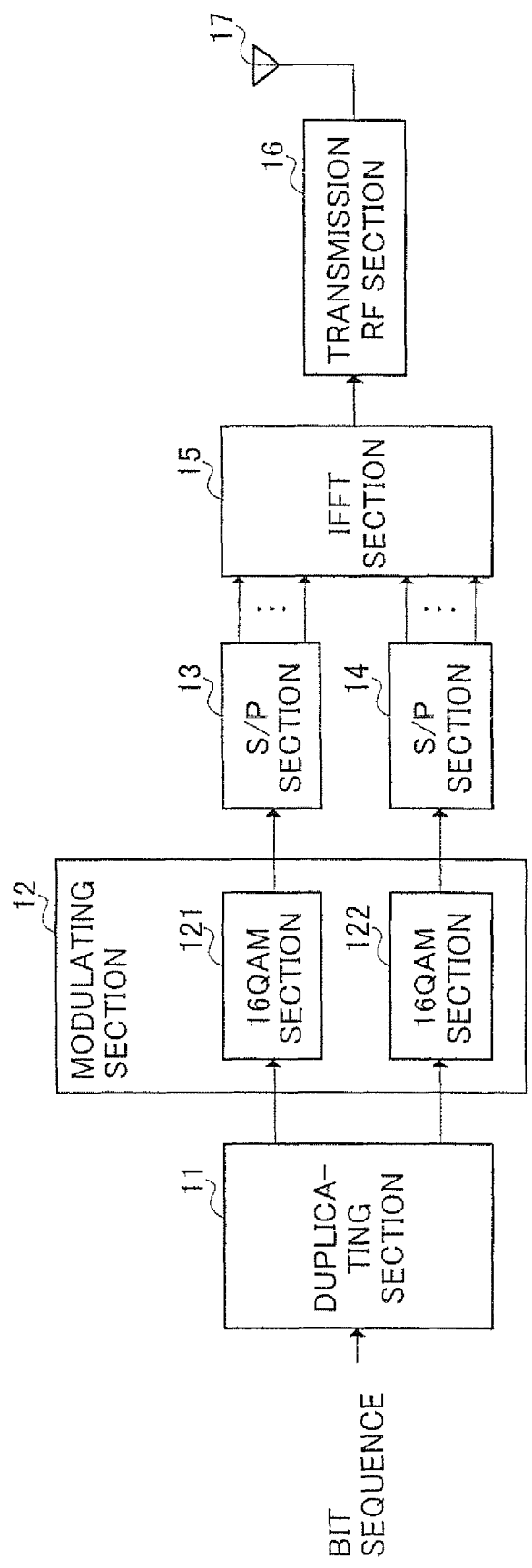
FIG. 1 is a block diagram illustrating a configuration of a radio transmitting apparatus according to Embodiment 1 of the present invention.

FIG. 1 is a block diagram illustrating a configuration of a radio transmitting apparatus according to Embodiment 1 of the present invention. The radio transmitting apparatus illustrated in FIG. 1 includes a duplicating section 11, a modulating section 12 having a 16QAM section 121 and a 16QAM section 122, an S/P section 13, an S/P section 14, an IFFT section 15, a transmission RF section 16, and an antenna 17, and transmits a multicarrier signal including multiple same bits each having a different frequency.

The duplicating section 11 duplicates a bit sequence to be input. This duplicates the same bit to generate multiple same bits. The bit sequence of the duplicating source is input to the 16QAM section 121 and the duplicated bit sequence is input to the 16QAM section 122.

The 16QAM section 121 modulates the bit sequence of the duplicating source by use of 16QAM modulation scheme to form a symbol. Further, the 16QAM section 122 modulates the duplicated bit sequence by use of 16QAM modulation scheme to form a symbol. As a result, the multiple same bits are included in each different symbol.

The S/P section 13 parallel converts a symbol sequence input in series from the 16QAM section 121, and inputs it to the IFFT section 15. Furthermore, the S/P section 14 parallel converts a symbol sequence input in series from the 16QAM section 122, and inputs it to the IFFT section 15.

The IFFT section 15 provides IFFT (Inverse Fast Fourier Transform) processing to the input symbol sequences. This generates a multicarrier signal in which each of the multiple symbols input from the S/P section 13 and the S/P section 14 is allocated to each of multiple subcarriers each having a different frequency. Since each of the multiple same bits duplicated by the duplicating section 11 is included in the different symbol, each of the multiple same bits is allocated to each of the multiple subcarriers each having a different frequency by this IFFT processing. As a result, a multicarrier signal including the multiple same bits each having a different frequency is generated.

Since an OFDM (Orthogonal Frequency Division Multiplexing) system is used as a multicarrier system herein, IFFT processing is performed. The OFDM system is one of multicarrier modulation schemes and a system in which the multiple subcarriers, which form the multicarrier signal (multicarrier signal generated by the OFDM system is particularly referred to as an OFDM signal), are orthogonal to each other. The use of OFDM system enables to overlap the spectrum of the respective subcarriers, thereby allowing improvement in spectrum efficiency.

Figure 2:
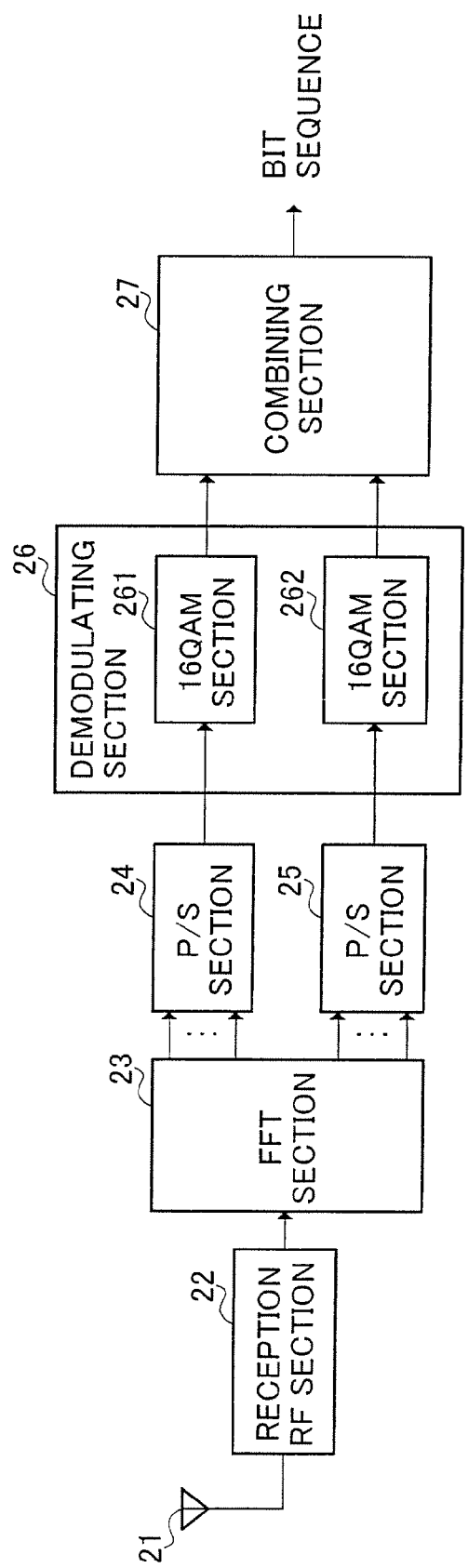
FIG. 2 is a block diagram illustrating a configuration of a radio receiving apparatus according to Embodiment 1 of the present invention.

The transmission RF section 16 provides predetermined radio processing (D/A conversion, upconvert, and the like) to the multicarrier signal input from the IFFT section 15, and thereafter transmits the multicarrier signal to a radio receiving apparatus shown in FIG. 2 through the antenna 17.

FIG. 2 is a block diagram illustrating a configuration of a radio receiving apparatus according to Embodiment 1 of the present invention. The radio receiving apparatus illustrated in FIG. 2 includes an antenna 21, a reception RF section 22, an FFT section 23, a P/S section 24, a P/S section 25, a demodulating section 26 having a 16QAM section 261 and a 16QAM section 262, and a combining section 27, and receives a multicarrier signal sent from the radio transmitting apparatus shown in FIG. 1 to combine likelihoods of multiple same bits included in the multicarrier signal.

The reception RF section 22 provides predetermined radio processing (downconvert, A/D conversion and the like) to the multicarrier signal received through the antenna 21.

The FFT section 23 provides FFT (Fast Fourier Transform) processing to the multicarrier signal input from the reception RF section 22. This divides the multicarrier signal into multiple symbols for each carrier. One half of the multiple symbols after division is input to the P/S section 24 in parallel, and the other half is input to the P/S section 25 in parallel.

The S/P section 24 series converts a symbol sequence input in parallel from the FFT section 23, and inputs it to the 16QAM section 261. Moreover, the S/P section 25 series converts a symbol sequence input in parallel from the FFT section 23, and inputs it to the 16QAM section 262.

The 16QAM section 261 demodulates the symbol using a 16QAM demodulation scheme and thereafter calculates a likelihood for each bit. Moreover, the 16QAM section 262 demodulates the symbol using a 16QAM demodulation scheme and thereafter calculates a likelihood for each bit.

Since the same bit as the bit included in the bit sequence input from the 16QAM section 261 is included in the bit sequence input from the 16QAM section 262, the combining section 27 combines the likelihoods of the multiple same bits. The combination in this way allows improvement in the reception quality.

An explanation will next be given of the operations of the above-configured radio transmitting apparatus and radio receiving apparatus.

Figure 3:
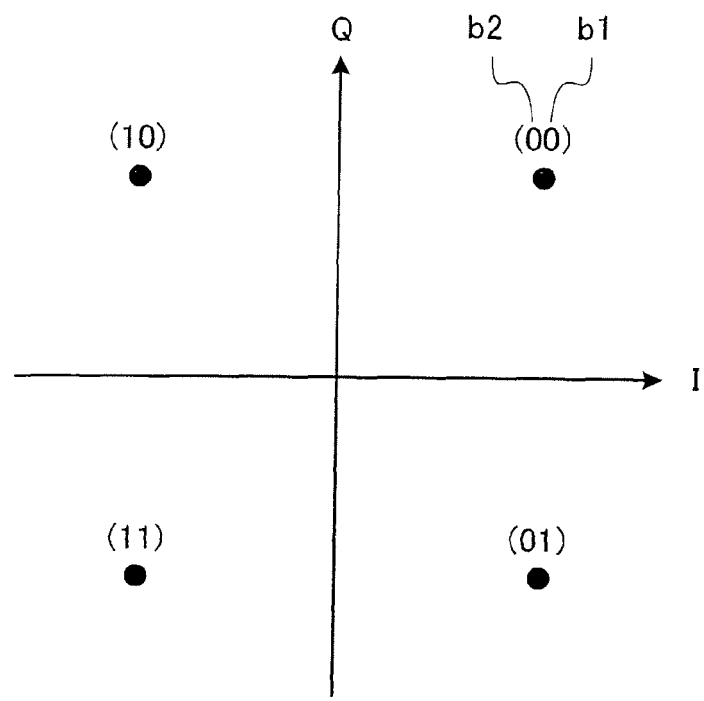
FIG. 3 is a view illustrating a mapping of each symbol in QPSK modulation.
Figure 4:
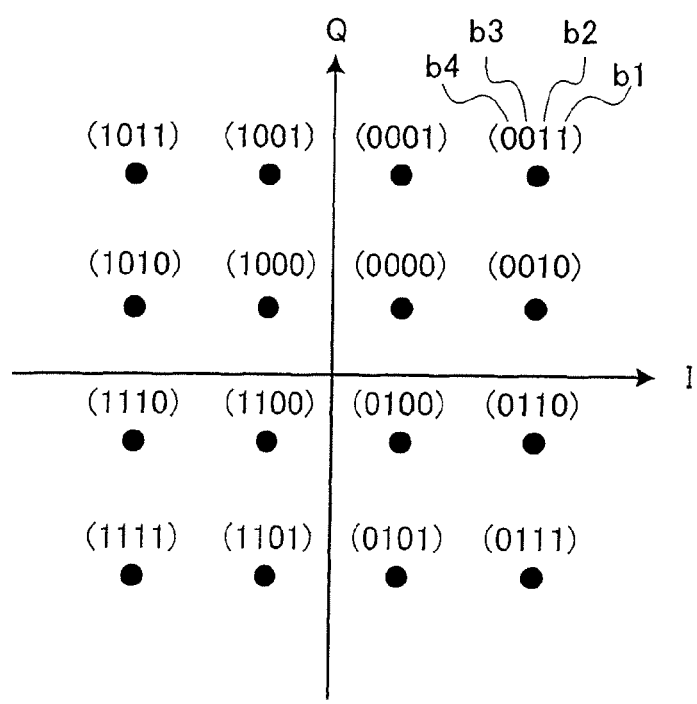
FIG. 4 is a view illustrating a mapping of each symbol in 16QAM modulation.

FIG. 3 is a view illustrating a mapping of each symbol in QPSK modulation. Moreover, FIG. 4 is a view illustrating a mapping of each symbol in 16QAM modulation. As illustrated in FIG. 3, since four mapping positions (namely, modulation level is 4) are provided in QPSK, the number of bits that can be included to one symbol to be transmitted is two. In contrast to this, as illustrated in FIG. 4, since 16 mapping positions (namely, modulation level is 16) are provided in 16QAM, the number of bits that can be included to one symbol to be transmitted is four. By changing the modulation scheme to 16QAM from QPSK in this way, the number of bits that can be included to one symbol to be transmitted can be doubled. Namely, the higher the modulation level is, the larger the number of bits that can be transmitted by one symbol is.

Additionally, in FIGS. 3 and 4, b1, b2, b3, and b4 are bit numbers showing positions where bits are arranged in the symbol, respectively. For example, in FIG. 4, b4 indicates the most significant bit and b1 indicates the least significant bit.

Figure 5:
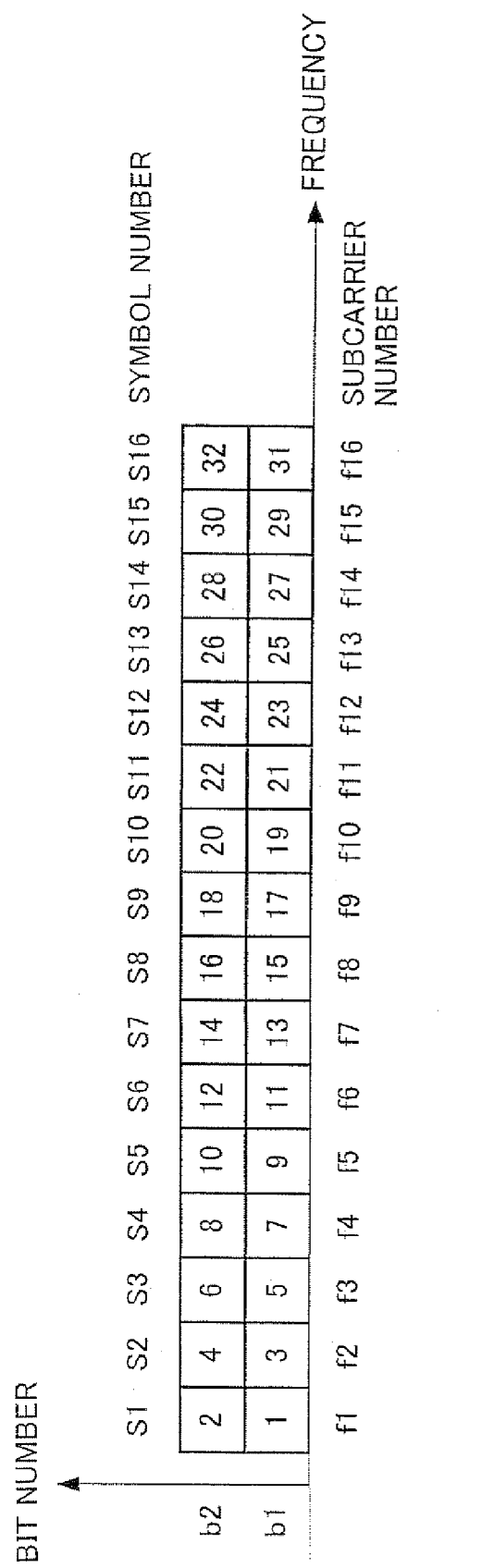
FIG. 5 is a view illustrating a corresponding relationship between a subcarrier and a transmission bit in QPSK modulation.

In the case where the modulation scheme is QPSK, a corresponding relationship between a subcarrier and a transmission bit is illustrated as in FIG. 5. In FIG. 5, a multicarrier signal includes 16 subcarriers of f1 to f16. Also, this shows a case in which a bit sequence of 32 bits of bits 1 to 32 is QPSK modulated and transmitted by 16 subcarriers of f1 to f16. Since the bit sequence of 32 bits is QPSK modulated, 16 symbols of S1 to S16 are generated. Symbols S1 to S16 are allocated to subcarriers f1 to f16, respectively. Furthermore, each symbol includes two bits.

Meanwhile, the radio transmitting apparatus illustrated in FIG. 1 uses 16QAM for the modulation scheme. As explained above, in 16QAM, the number of bits, which is twice as large as QPSK, can be transmitted by the same symbol. Namely, the change of QPSK to 16QAM makes it possible to transmit 64 bits by 16 symbols and 16 subcarriers. In other words, 32 bits, which were transmitted by 16 subcarriers in QPSK, can be transmitted by the half, that is, eight subcarriers in 16QAM. That is, the change of QPSK to 16QAM generates allowance in 8 subcarriers. Accordingly, the radio transmitting apparatus shown in FIG. 1 transmits the duplicated same bits 1 to 32 by 8 subcarriers having the generated allowance. This can be specifically explained as follows.

Figure 6:
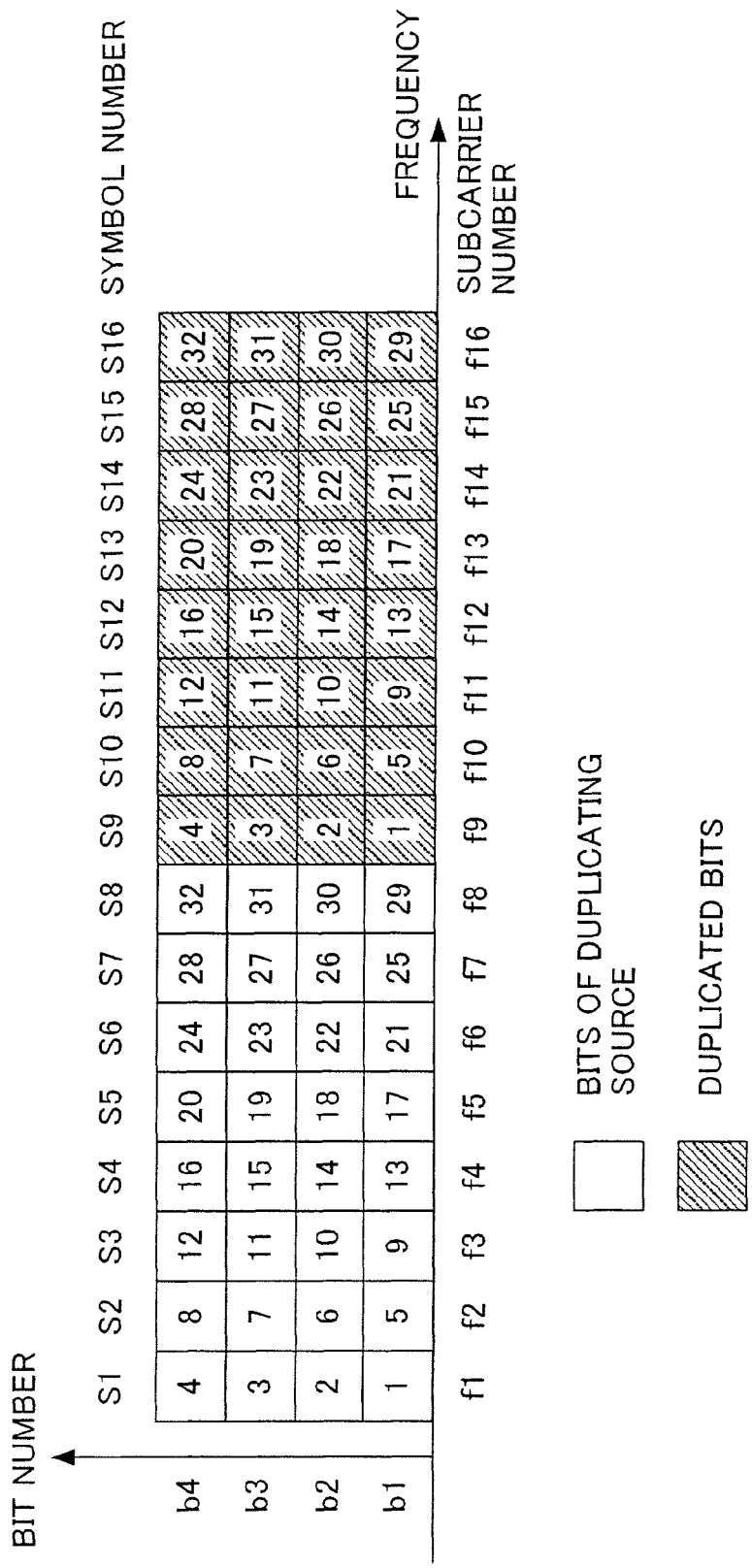
FIG. 6 is a view illustrating a corresponding relationship between a subcarrier and a transmission bit according to Embodiment 1 of the present invention.

FIG. 6 is a view illustrating a corresponding relationship between a subcarrier and a transmission bit according to Embodiment 1 of the present invention. First of all, the radio transmitting apparatus shown in FIG. 1 duplicates the bit sequence of bits 1 to 32. Then, it is assumed that the bits 1 to 32 of the duplicating source are 16QAM modulated to be set as symbols S1 to S8 and that the duplicated bits 1 to 32 are 16QAM modulated to be set as symbols S9 to S16. Each of the multiple same bits is thereby included in the different symbol. For example, as illustrated in FIG. 6, the bits 1 to 4 are included in both symbols S1 and S9.

Here, in this embodiment, since the modulation scheme was changed from QPSK to 16QAM (the modulation level was changed from 4 to 16), the same bit was duplicated to create two same bits. However, the modulation scheme may be changed from QPSK to 64QAM or 256QAM. In the case of 64QAM, namely, when the modulation level is 64, the number of bits, which is three times as that of QPSK, can be transmitted by the same number of symbols and subcarriers as those of QPSK. Accordingly, in the case of 64QAM, the same bit is duplicated to create three same bits. Furthermore, in the case of 256QAM, namely, when the modulation level is 256, the number of bits, which is four times as that of QPSK, can be transmitted by the same number of symbols and subcarriers as those of QPSK. Accordingly, in the case of 256QAM, the same bit is duplicated to create four same bits. In addition, the modulation scheme is changed from BPSK to QPSK, making it possible to transmit the number of bits, which is two times as that of BPSK.

The symbol sequence of symbols S1 to S8 and the symbol sequence of symbols S9 to S16 are series-parallel converted individually, and thereafter subjected to IFFT processing. By IFFT processing, as illustrated in FIG. 6, the symbols S1 to S8 are allocated to the subcarriers f1 to f8. Moreover, the symbols S9 to S16 are allocated to the subcarriers f9 to f16 having allowance generated by changing the modulation scheme to 16QAM from QPSK. In other words, the bits 1 to 32 of the duplicating source are allocated to the subcarriers f1 to f8 and the duplicated bits 1 to 32 are allocated to the subcarriers f9 to f16. As a result, the same bits are allocated to the subcarriers each having a different frequency. For example, bit 1 is allocated to both subcarriers f1 and f9. Bit 1 is thereby transmitted by two frequencies of frequency 1 and frequency f9. The multicarrier signal including the subcarriers f1 to f16 is transmitted to the radio receiving apparatus as illustrated in FIG. 2.

Figure 7:
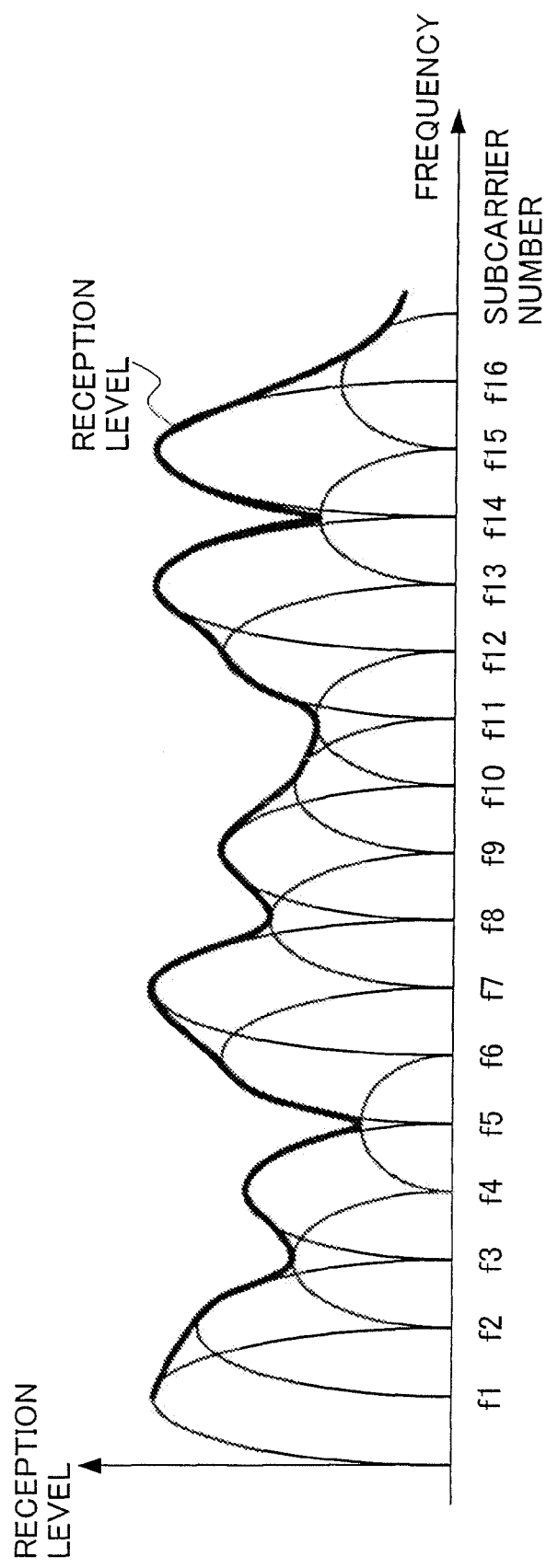
FIG. 7 is a view illustrating fading variation.

As illustrated in FIG. 7, fading variation in a frequency axial direction is largely changed by an influence of a multipath. For this reason, a reception level varies for each subcarrier. Therefore, even if a reception level of bit 1 allocated to the subcarrier f1 is low, a reception level of bit 1 allocated to the subcarrier f9 is high in some cases.

The radio receiving apparatus of FIG. 2, which received the multicarrier signal, combines the likelihoods of the same bits allocated to the different subcarriers. For example, the radio receiving apparatus combines the likelihood of bit 1 allocated to the subcarrier f1 and that of bit 1 allocated to the subcarrier f9. This enables to obtain frequency diversity gain, allowing improvement in the reception quality of bits 1 to 32 included in the bit sequence.

Figure 8:
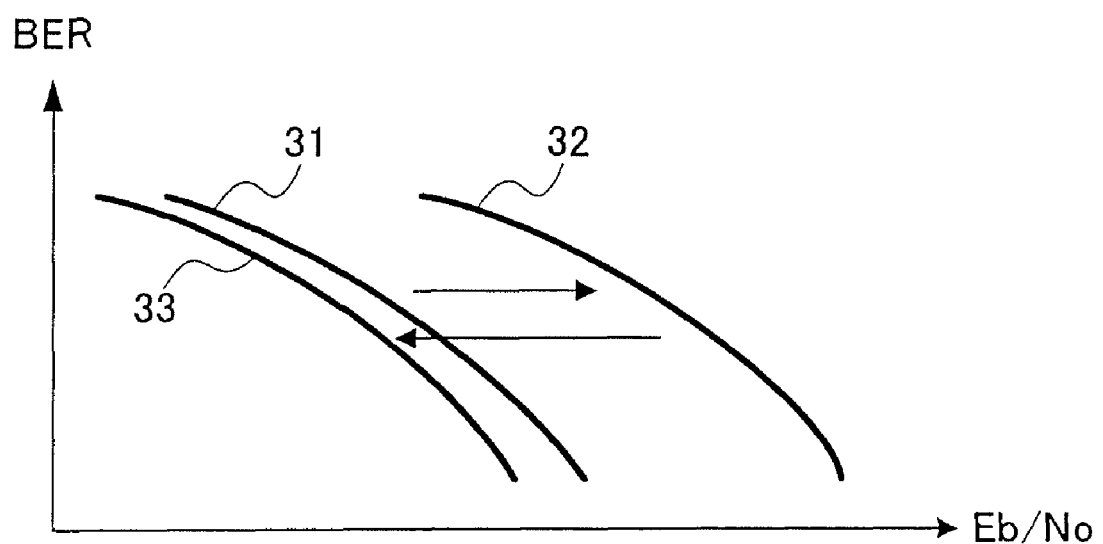
FIG. 8 is a view illustrating an error rate characteristic.

In addition, it can be considered that an error rate characteristic deteriorates as shown in FIG. 8 if no processing is performed after the modulation scheme is changed to 16QAm from QPSK. In FIG. 8, 31 denotes an error rate characteristic of QPSK, and 32 denotes an error rate characteristic of 16QAM. However, according to this embodiment, it can be considered that since the likelihoods of the multiple same bits each having a different frequency, which are included in the multicarrier signal, are combined with each other, frequency diversity gain is obtained, with the result that the error rate characteristic is more improved than QPSK as shown by 33.

As mentioned above, according to this embodiment, the multicarrier signal, which includes the multiple same bits each having a different frequency, is transmitted and the likelihoods of the multiple same bits each having a different frequency, which are included in one multicarrier signal, are combined with each other. For this reason, diversity gain in the frequency axial direction can be obtained by one transmission. Namely, it is possible to improve the reception quality without performing transmission and retransmission by a plurality of antennas. Moreover, diversity gain can be obtained without changing a transmission rate, enabling to improve the reception quality. Furthermore, since the higher the modulation level is, the larger the number of same bits included in the multicarrier signal, it is possible to further improve diversity gain in the frequency axial direction by increasing the modulation level.

Embodiment 2

Figure 9:
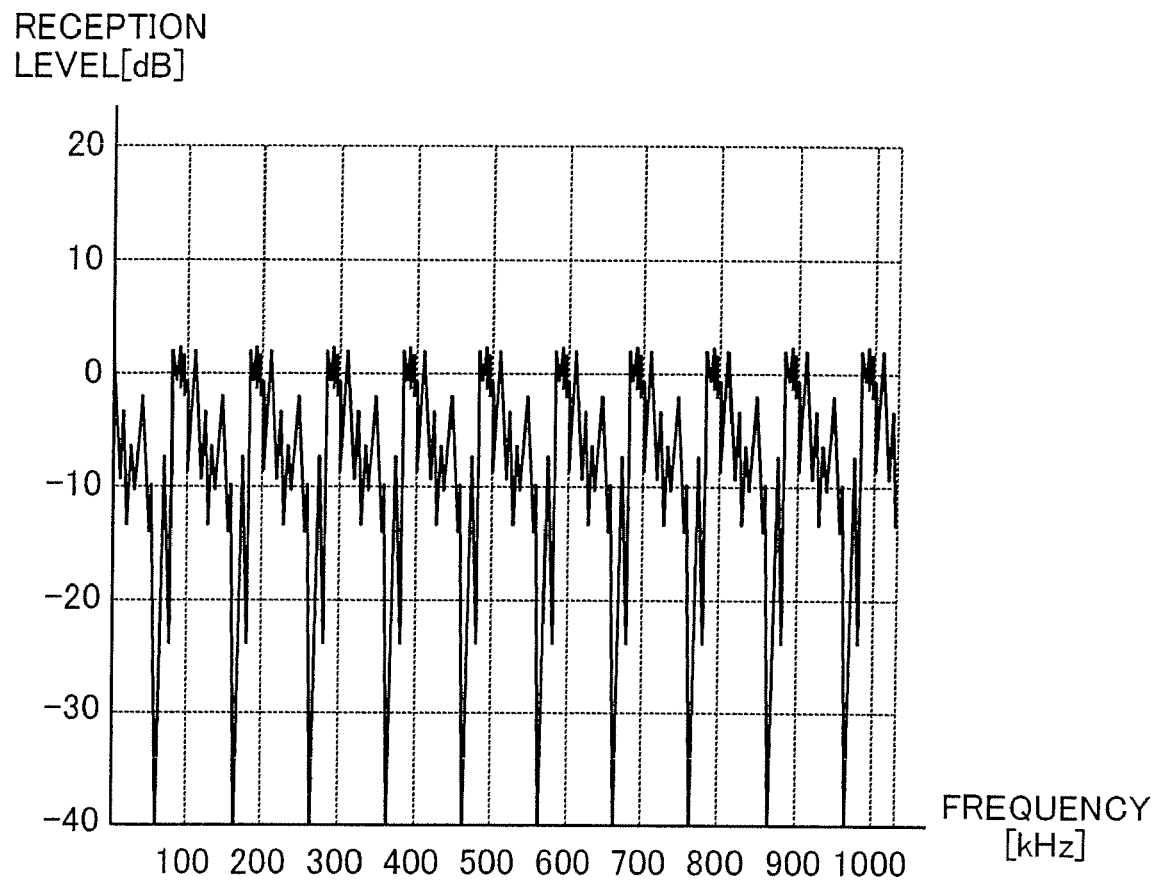
FIG. 9 is a view illustrating fading variation.

The fading variation normally has a periodicity in the frequency axial direction as illustrated in FIG. 9. For this reason, if the symbols having the same bits are periodically arranged, the reception levels of all same bits largely drop, so that diversity gain cannot be obtained in some cases.

Accordingly, this embodiment prevents the symbols having the same bits from being periodically arranged on the frequency axis. For example, in FIG. 6, a distance between symbols S1 and S9 on the frequency axis is made different from a distance between symbols S2 and S10 on the frequency axis. This is achieved by the following configuration.

Figure 10:
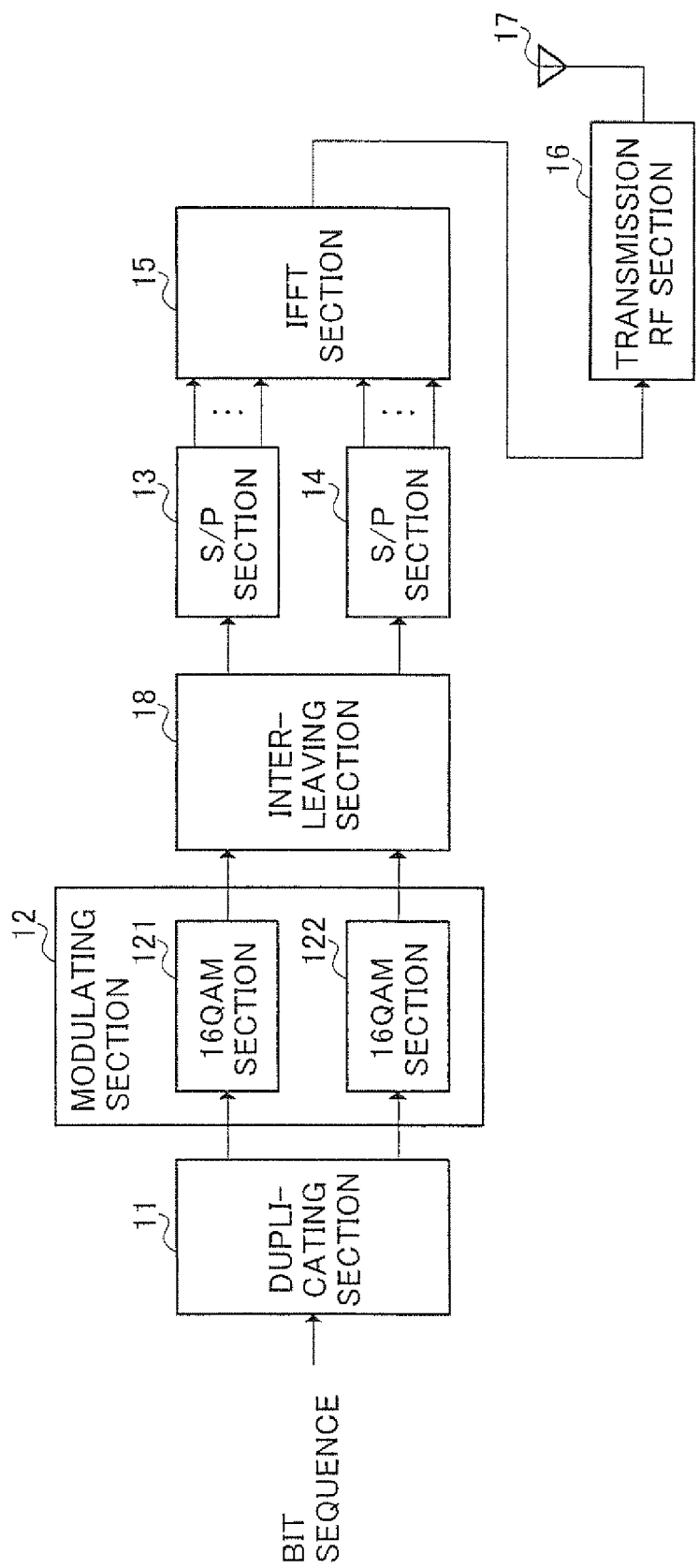
FIG. 10 is a block diagram illustrating a configuration of a radio transmitting apparatus according to Embodiment 2 of the present invention.

FIG. 10 is a block diagram illustrating a configuration of a radio transmitting apparatus according to Embodiment 2 of the present invention. However, the same reference numerals as those of the components (FIG. 1) of Embodiment 1 are added to the same components of Embodiment 1, and the explanation will be omitted. An interleaving section 18 rearranges the order of the symbol sequence output from the modulating section 12. Namely, the interleaving section 18 interleaves the symbol sequence according to a predetermined interleaving pattern.

Figure 11:
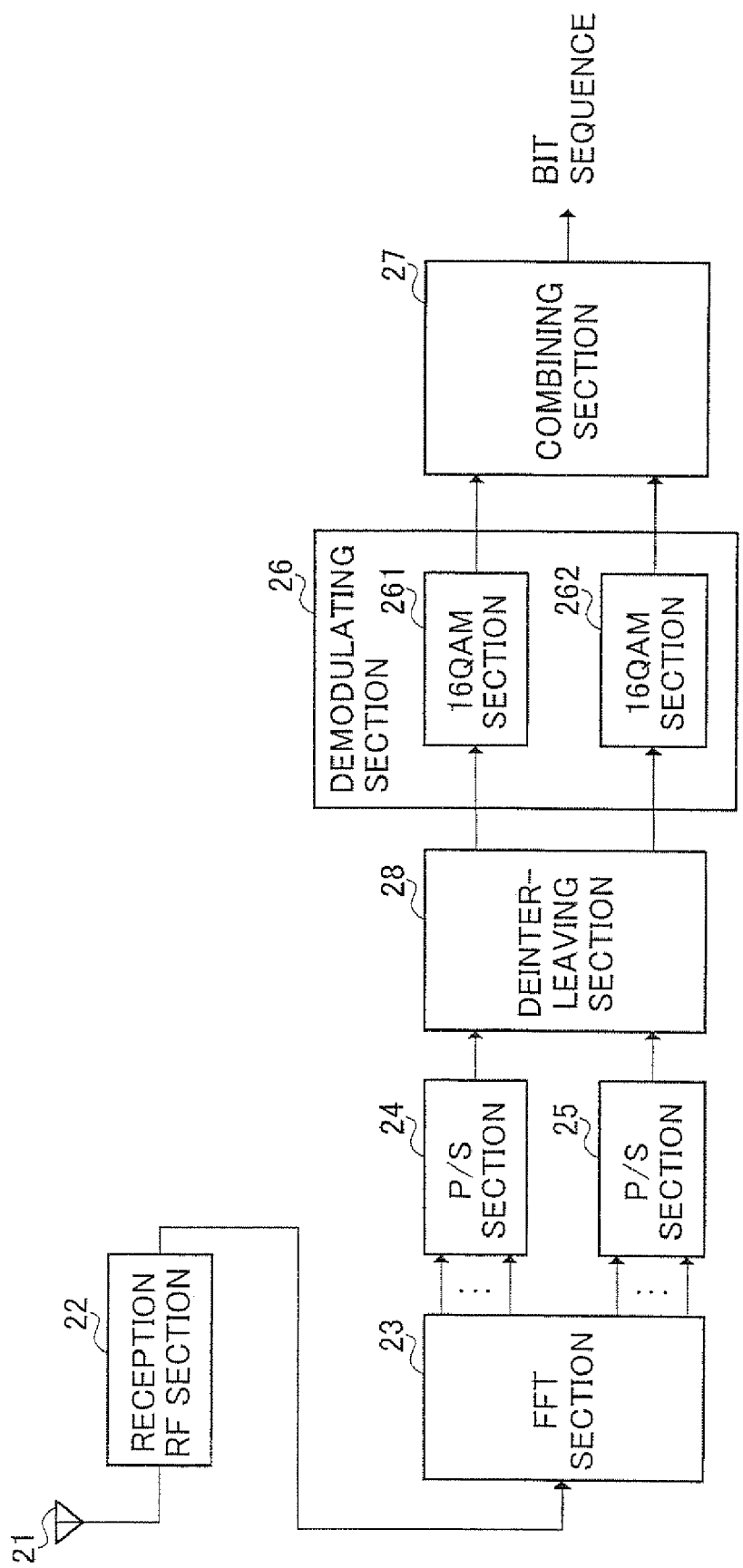
FIG. 11 is a block diagram illustrating a configuration of a radio receiving apparatus according to Embodiment 2 of the present invention.

Moreover, FIG. 11 is a block diagram illustrating a configuration of a radio receiving apparatus according to Embodiment 2 of the present invention. However, the same reference numerals as those of the components (FIG. 2) of Embodiment 1 are added to the same components of Embodiment 1, and the explanation will be omitted. A deinterleaving section 28 rearranges the order of the symbol sequence output from the P/S section 24 and the P/S section 25 in reverse to the interleaving made by the radio transmitting apparatus to set a symbol sequence which is in a state that interleaving is not yet made. In other words, the symbol sequence is deinterleaved according to the interleaving made by the radio transmitting apparatus.

An explanation will next be given of a symbol interleaving method. According to this embodiment, any one of the following three methods shown in FIGS. 12 to 14 is performed as a symbol interleaving.

Figure 12:
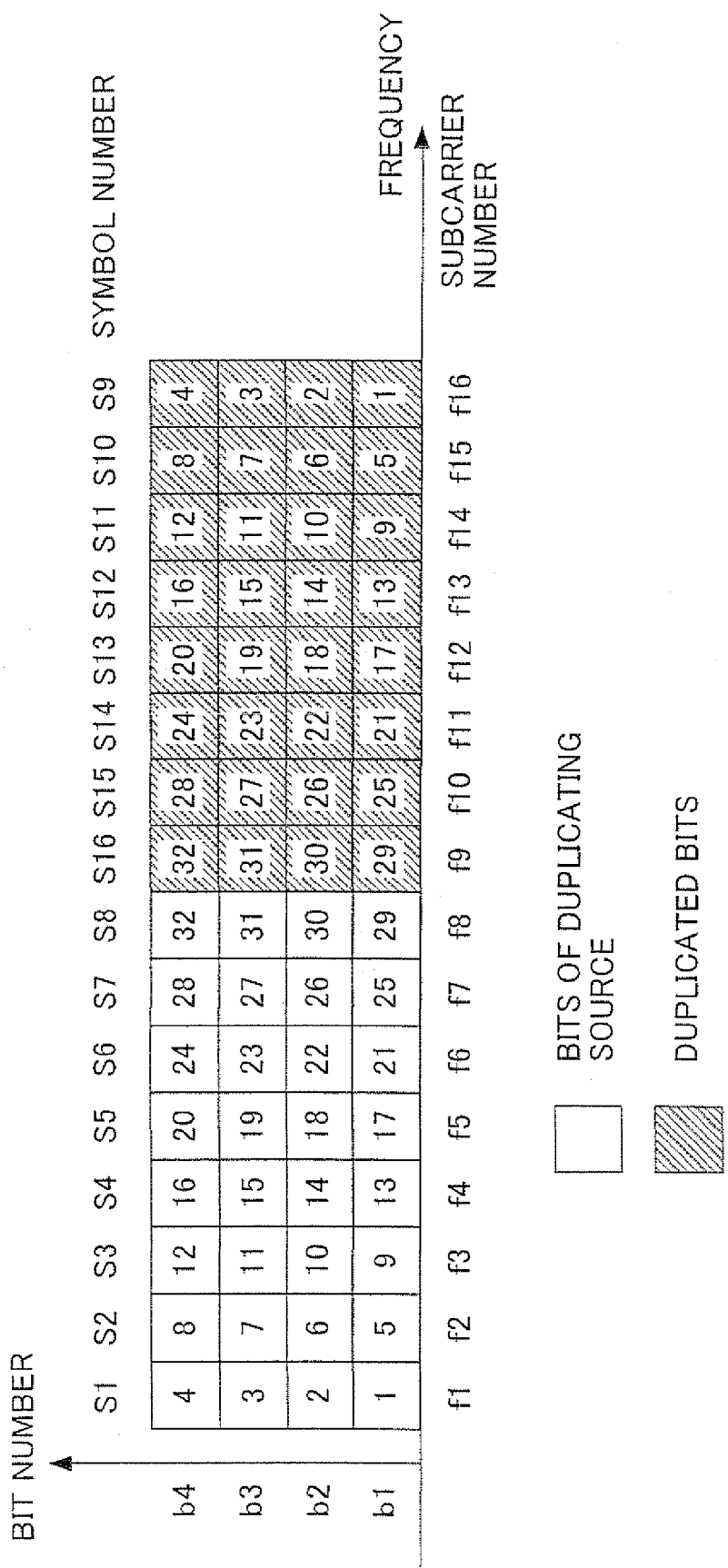
FIG. 12 is a view illustrating a corresponding relationship between a subcarrier and a transmission bit according to Embodiment 2 of the present invention.

In the interleaving method illustrated in FIG. 12, the order of the symbol sequence having the bits of the duplicating source is unchanged, and the order of the symbol sequence having the duplicated bits is reversed to the order of the symbol sequence having the bits of the duplicating source. Accordingly, symbol S9, which was allocated to the subcarrier f9 in FIG. 6, is allocated to the subcarrier f16 in FIG. 12. Moreover, symbol S16, which was allocated to the subcarrier f16 in FIG. 6, is allocated to the subcarrier f9 in FIG. 12. This enables to prevent the distance between the symbols having the same bits from being conformed to the periodicity of fading variation. This makes it possible to improve frequency diversity effect as compared with Embodiment 1.

Figure 13:
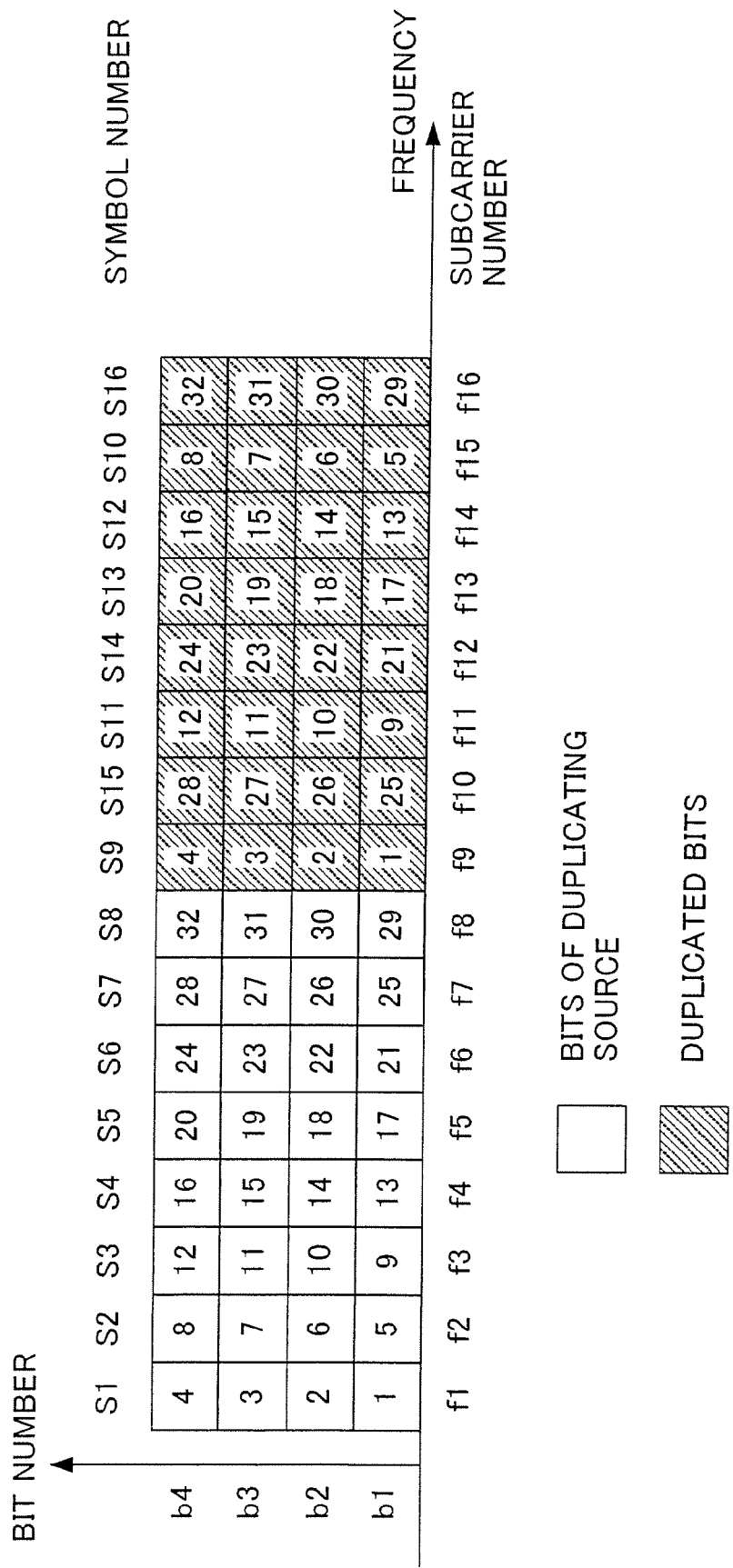
FIG. 13 is a view illustrating a corresponding relationship between a subcarrier and a transmission bit according to Embodiment 2 of the present invention.

Furthermore, in the interleaving method illustrated in FIG. 13, the order of the symbol sequence having the bits of the duplicating source is unchanged, and the order of the symbol sequence having the duplicated bits is rearranged regardless of the order of the symbol sequence having the bits of the duplicating source. For example, as illustrated in FIG. 13, only symbols S9 to S16 are rearranged. This enables to prevent the distance between the symbols having the same bits from being conformed to the periodicity of fading variation. Also, as compared with the interleaving method shown in FIG. 12, fading variation that the same bits receive becomes large, enhancing more frequency diversity effect.

Figure 14:
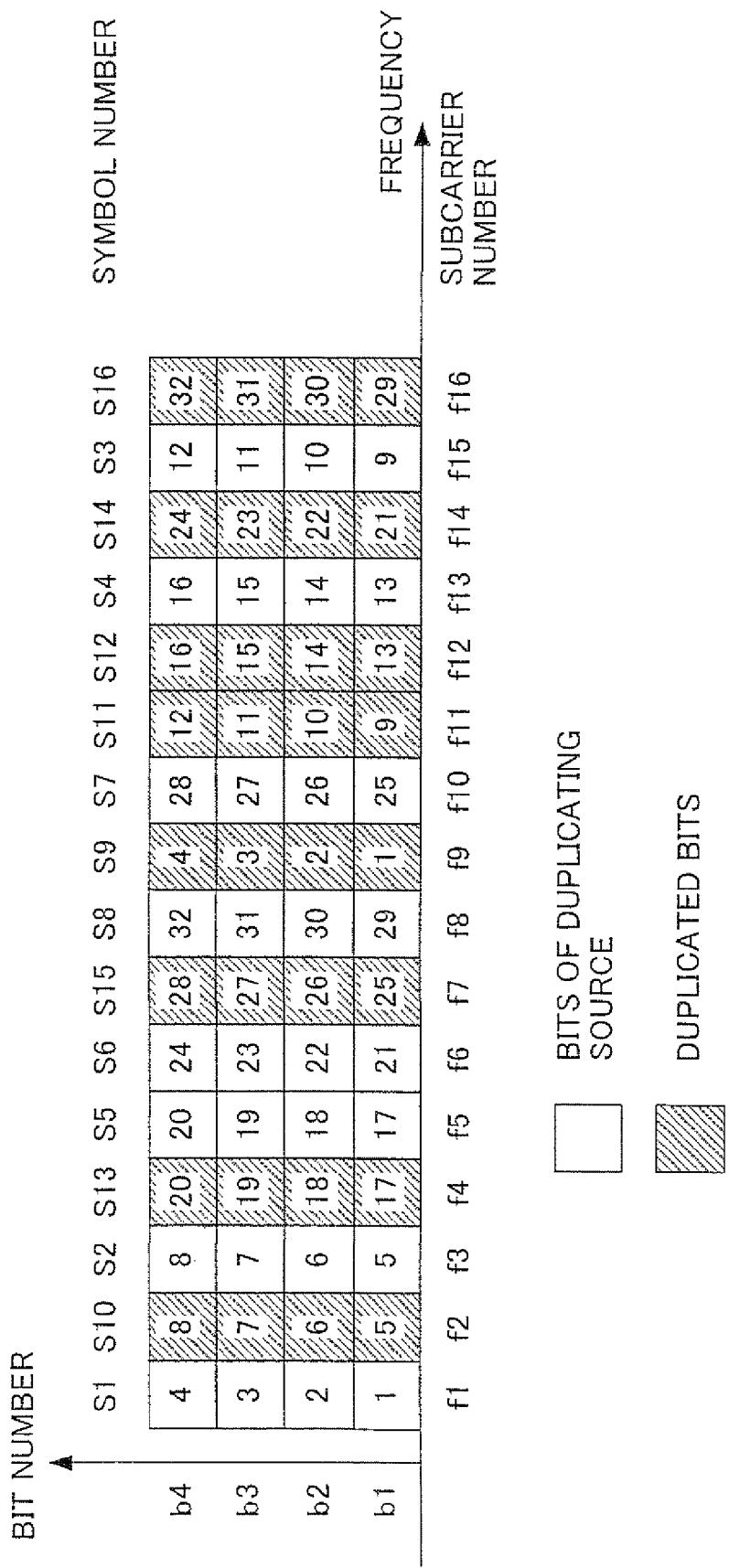
FIG. 14 is a view illustrating a corresponding relationship between a subcarrier and a transmission bit according to Embodiment 2 of the present invention.

Furthermore, in the interleaving method shown in FIG. 14, the symbol sequence having the bits of the duplicating source and the symbol sequence having the duplicated bits are combined and rearranged. For example, as illustrated in FIG. 14, all symbols S1 to S16 are rearranged. Similar to FIG. 12, this enables to prevent the distance between the symbols having the same bits from being conformed to the periodicity of fading variation. Also, as compared with the interleaving method shown in FIG. 13, fading variation that the same bits receive becomes much large, enhancing much more frequency diversity effect.

In this embodiment, according to this configuration, when the fading variation in the frequency axial direction has a periodicity, magnitude in the fading variation that each of the multiple same bits receives at a transmission path can be made different, so that frequency diversity gain in the frequency axial direction can be more improved.

Embodiment 3

This embodiment prevents the multiple same bits from being periodically arranged on the frequency axis. This is achieved by the following configuration.

Figure 15:
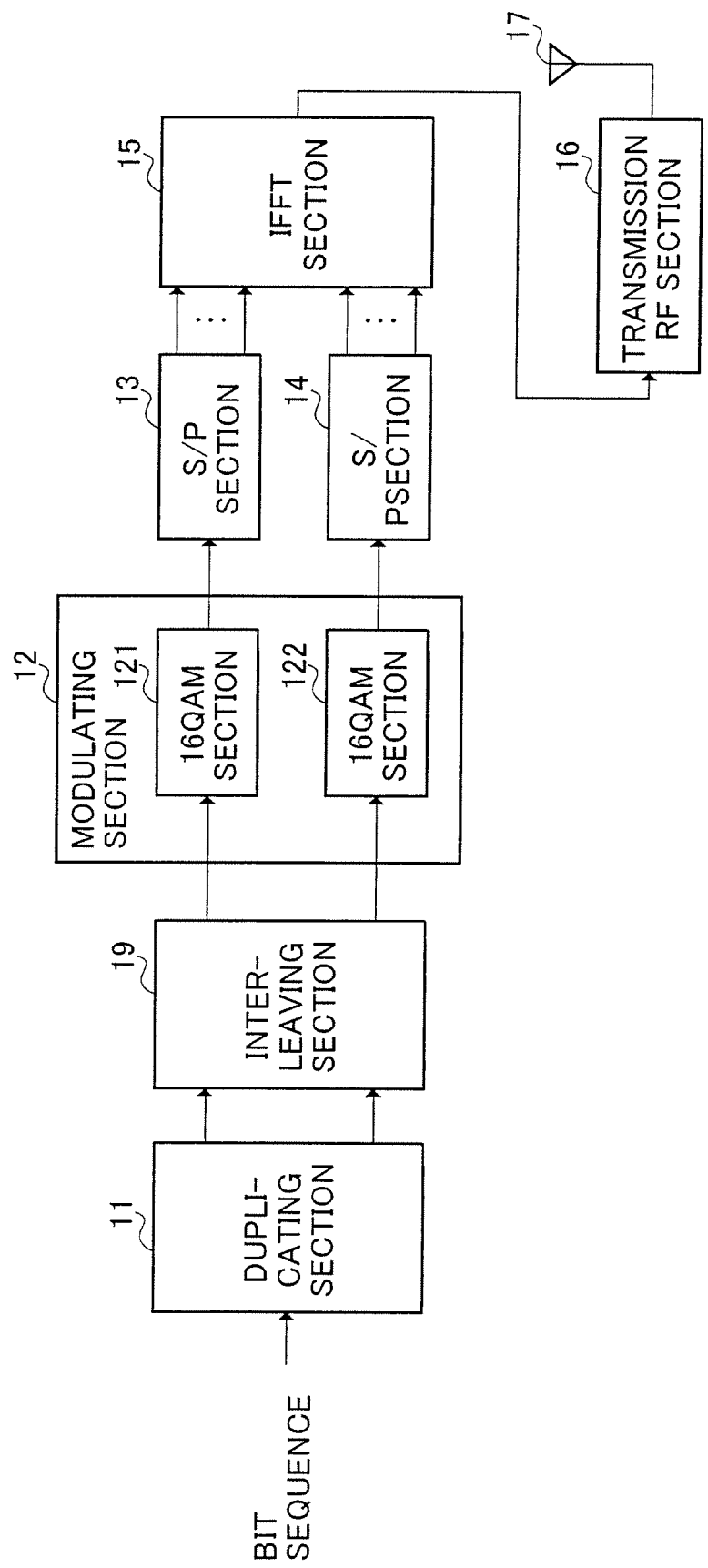
FIG. 15 is a block diagram illustrating a configuration of a radio transmitting apparatus according to Embodiment 3 of the present invention.

FIG. 15 is a block diagram illustrating a configuration of a radio transmitting apparatus according to Embodiment 3 of the present invention. However, the same reference numerals as those of the components (FIG. 1) of Embodiment 1 are added to the same components of Embodiment 1, and the explanation will be omitted. An interleaving section 19 rearranges the order of the symbol sequence output from the duplicating section 11. Namely, the interleaving section 19 interleaves the bit sequence according to a predetermined interleaving pattern.

The 16QAM section 121 modulates the bit sequence of higher-order 32 bits of 64 bits by use of 16QAM modulation scheme to form a symbol. Further, the 16QAM section 122 modulates the bit sequence of lower-order 32 bits of 64 bits by use of 16QAM modulation scheme to form a symbol.

Figure 16:
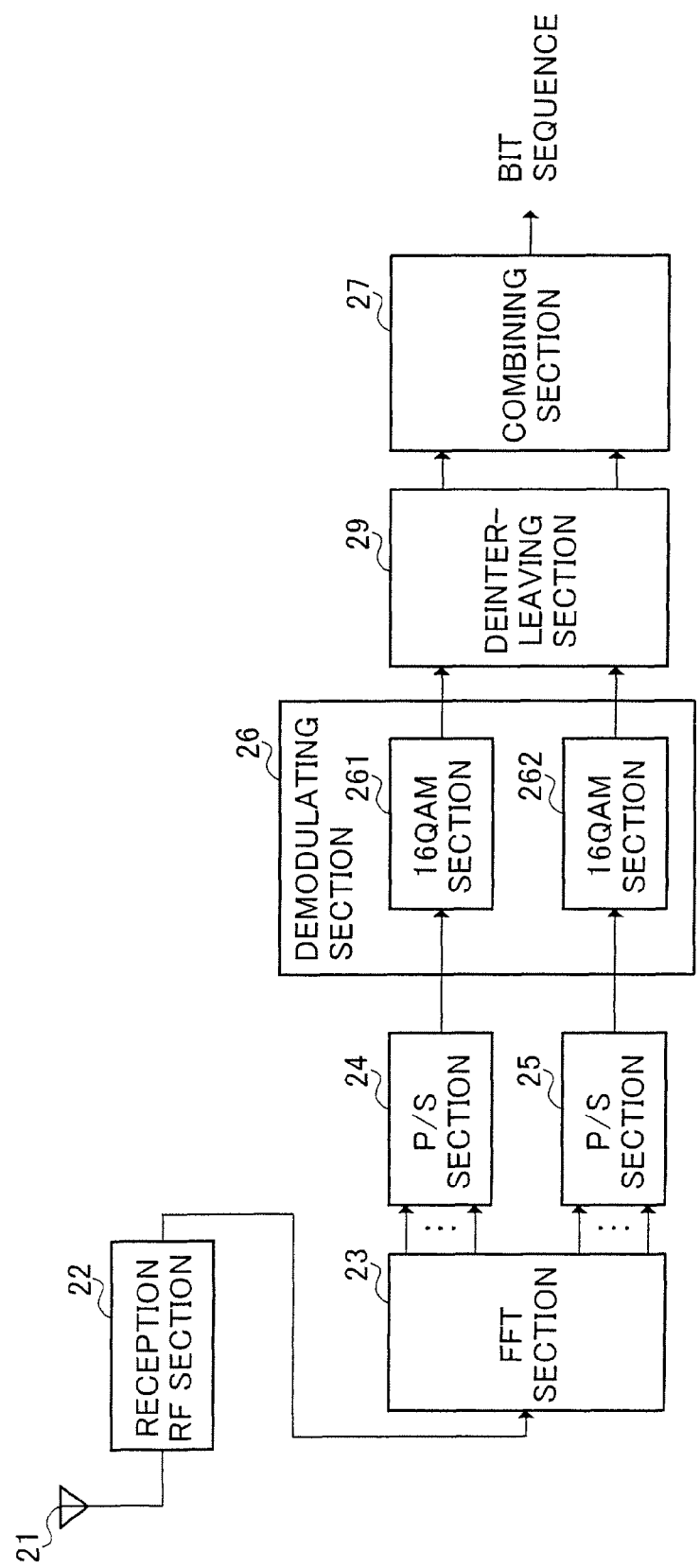
FIG. 16 is a block diagram illustrating a configuration of a radio receiving apparatus according to Embodiment 3 of the present invention.

Furthermore, FIG. 16 is a block diagram illustrating a configuration of a radio receiving apparatus according to Embodiment 3 of the present invention. However, the same reference numerals as those of the components (FIG. 2) of Embodiment 1 are added to the same components of Embodiment 1, and the explanation will be omitted. A deinterleaving section 29 rearranges the order of the bit sequence output from the demodulating section 26 in reverse to the interleaving made by the radio transmitting apparatus to set a symbol sequence which is in a state that interleaving is not yet made. In other words, the bit sequence is deinterleaved according to the interleaving made by the radio transmitting apparatus.

An explanation will next be given of a bit interleaving method. According to this embodiment, either of two methods shown in FIGS. 17 and 18 is performed as a bit interleaving.

Figure 17:
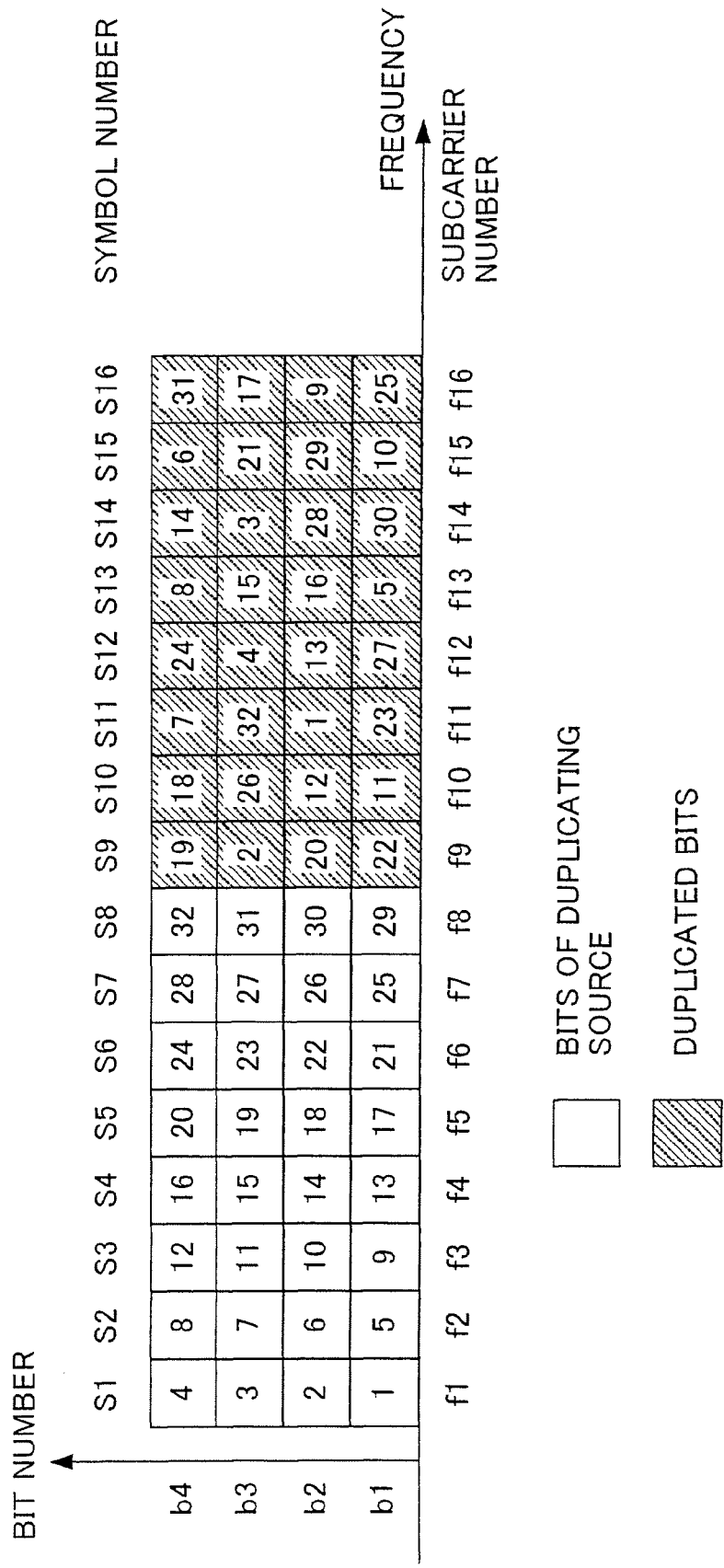
FIG. 17 is a view illustrating a corresponding relationship between a subcarrier and a transmission bit according to Embodiment 3 of the present invention.

In the interleaving method illustrated in FIG. 17, the order of the bit sequence of the duplicating source is unchanged, and the order of the duplicated bit sequence duplicated is rearranged regardless of the order of the bit sequence of the duplicating source. For example, as illustrated in FIG. 17, only the duplicated bits 1 to 32 are rearranged. This enables to prevent the distance between the same bits on the frequency axis from being conformed to the periodicity of fading variation. Also, fading variation that the same bits receive becomes large, enhancing more frequency diversity effect.

Figure 18:
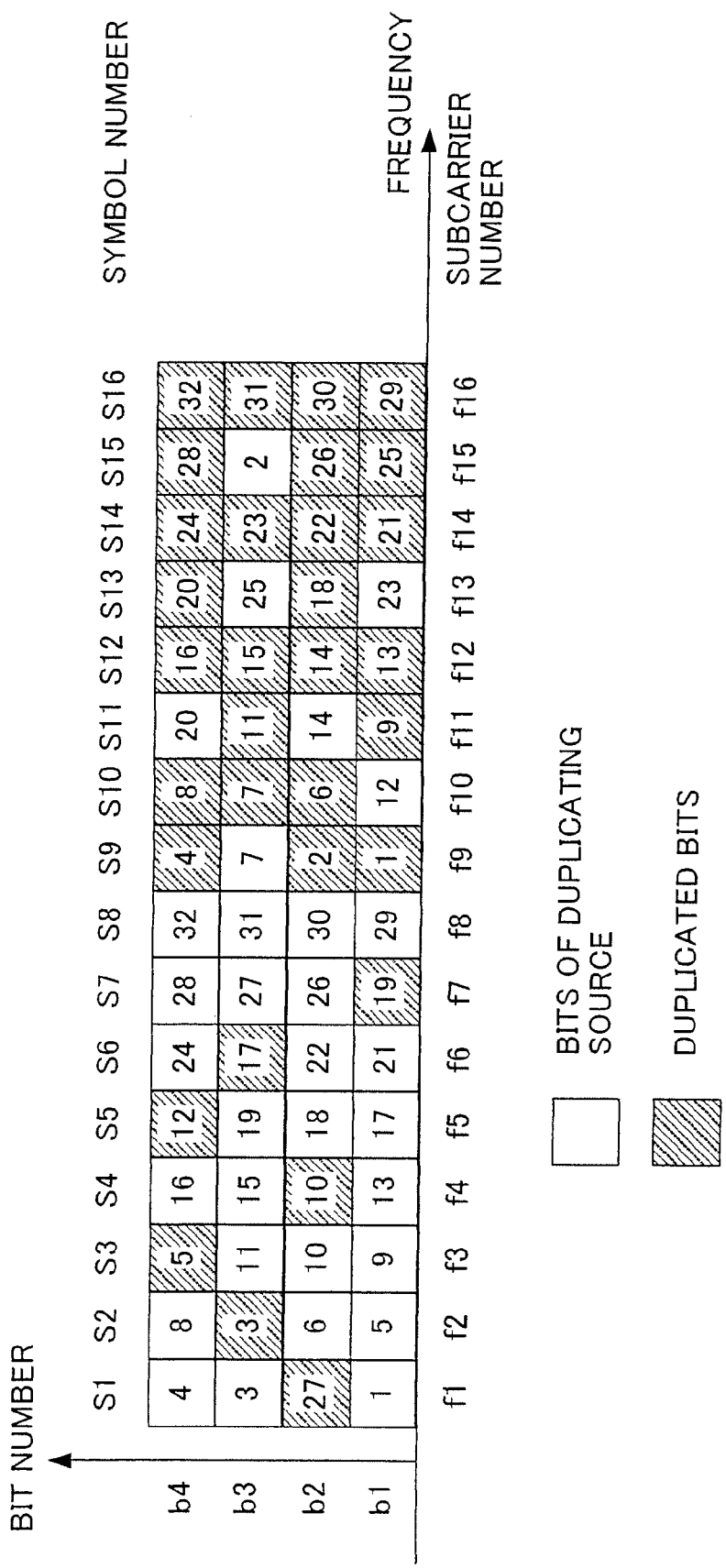
FIG. 18 is a view illustrating a corresponding relationship between a subcarrier and a transmission bit according to Embodiment 3 of the present invention.

Furthermore, in the interleaving method shown in FIG. 18, the bit sequence of the duplicating source and the duplicated bit sequence are combined and rearranged. For example, as illustrated in FIG. 18, all of the bits 1 to 32 of the duplicating source and the duplicated bits 1 to 31 are rearranged. Similar to FIG. 17, this enables to prevent the distance between the symbols having the same bits from being conformed to the periodicity of fading variation. Also, as compared with the interleaving method shown in FIG. 17, fading variation that the same bits receive becomes much large, enhancing much more frequency diversity effect.

According to this embodiment, when the fading variation has a periodicity in the frequency axial direction, the fading variation that each of the multiple same bits receives at a transmission path increases, thereby more improving frequency diversity gain in the frequency axial direction.

Embodiment 4

In 16QAM, among four bits included in one symbol, the likelihood of the higher-order two bits is higher than that of the lower-order two bits from the relationship among the mapping positions of 16 points of the symbols. This embodiment uses this and performs modulation such that the positions where the multiple same bits are arranged are made different from one another in the symbol having the bits of the duplicating source and the symbol having the duplicated bits. Namely, in the symbol having the bits of the duplicating source and the symbol having the duplicated bits, modulation is performed such that their mappings are made different from one another. This is achieved by the following configuration.

Figure 19:
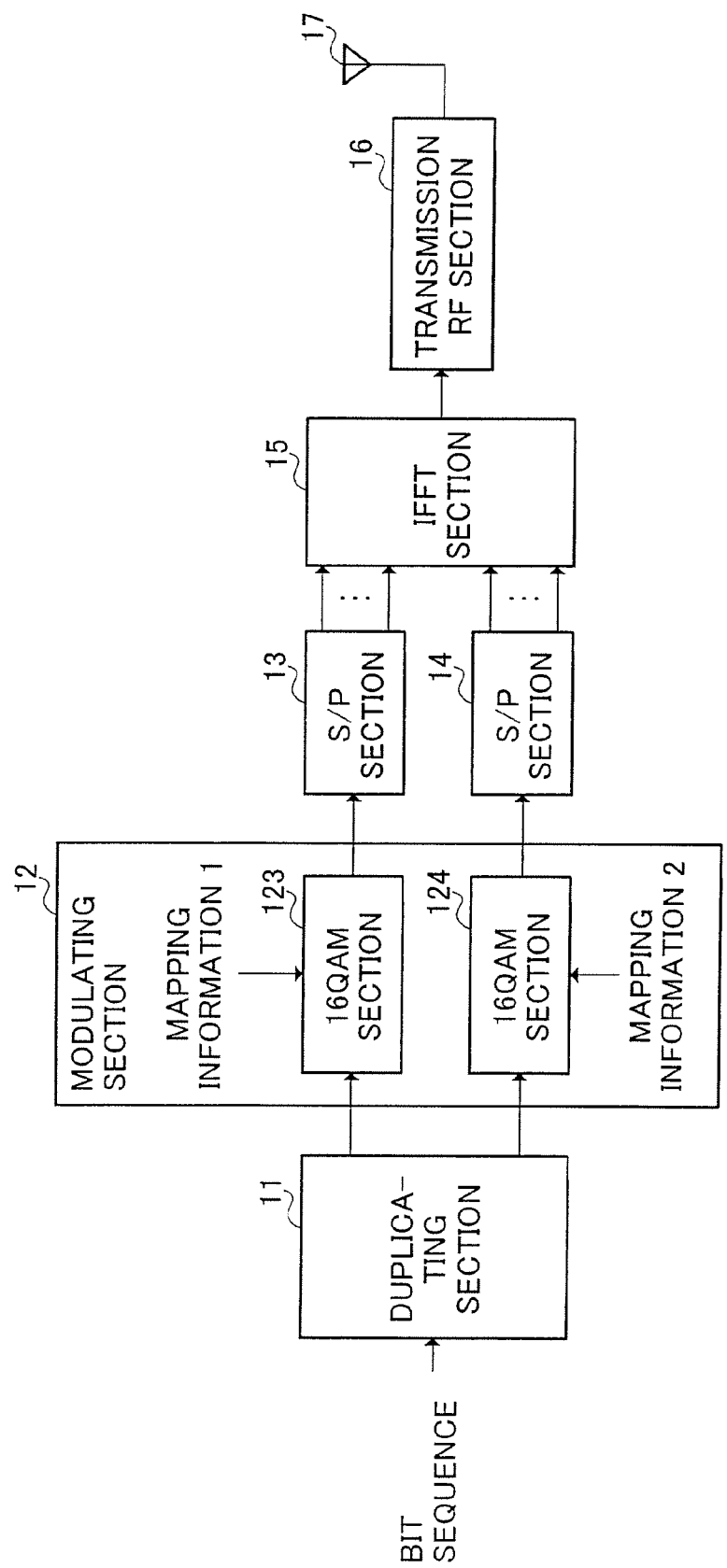
FIG. 19 is a block diagram illustrating a configuration of a radio transmitting apparatus according to Embodiment 4 of the present invention.

FIG. 19 is a block diagram illustrating a configuration of a radio transmitting apparatus according to Embodiment 4 of the present invention. However, the same reference numerals as those of the components (FIG. 1) of Embodiment 1 are added to the same components of Embodiment 1, and the explanation will be omitted. According to a mapping pattern given by mapping information 1 shown in FIG. 20, the 16QAM section 123 modulates the bit sequence of the duplicating source by use of 16QAM modulation scheme to form a symbol. Also, according to a mapping pattern given by mapping information 2 shown in FIG. 21, the 16QAM section 124 modulates the duplicated bit sequence by use of 16QAM modulation scheme to form a symbol.

Figure 20:
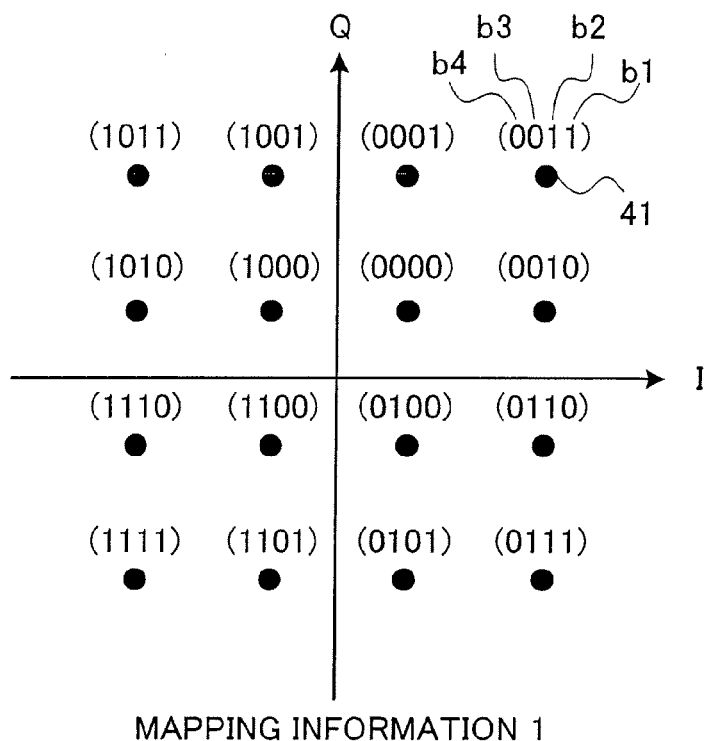
FIG. 20 is a view illustrating a mapping pattern according to Embodiment 4 of the present invention.
Figure 21:
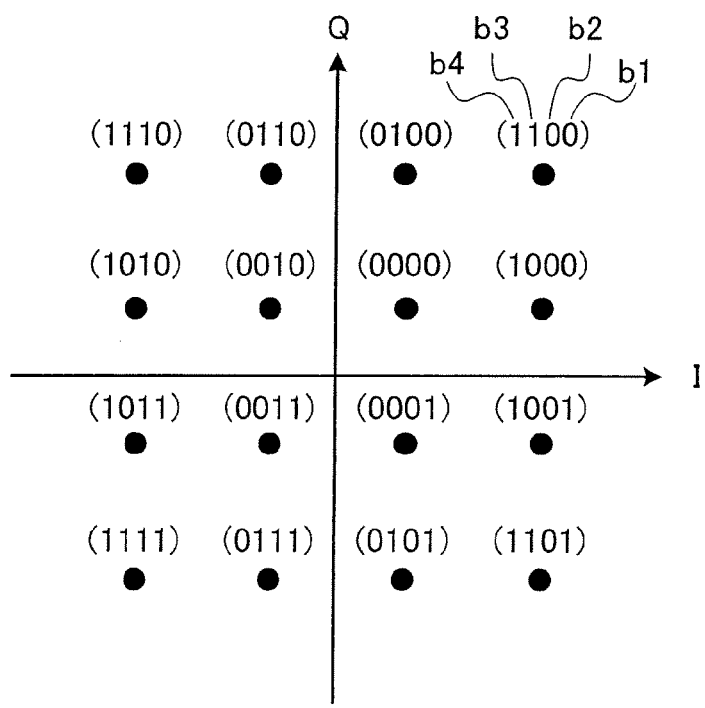
FIG. 21 is a view illustrating a mapping pattern according to Embodiment 4 of the present invention.

For example, attention is paid to a mapping point 41 in FIGS. 20 and 21. In FIG. 20, higher-order two bits are "00" and lower-order two bits are "11." In FIG. 21, higher-order two bits are "11" and lower-order two bits are "00." Accordingly, the same bits as those arranged at the higher-order two bits of the symbol by the 16QAM section 123 are arranged at the lower-order two bits of the symbol by the 16QAM 124. Also, the same bits as those arranged at the lower-order two bits of the symbol by the 16QAM section 123 are arranged at the higher-order two bits of the symbol by the 16QAM section 124.

Figure 22:
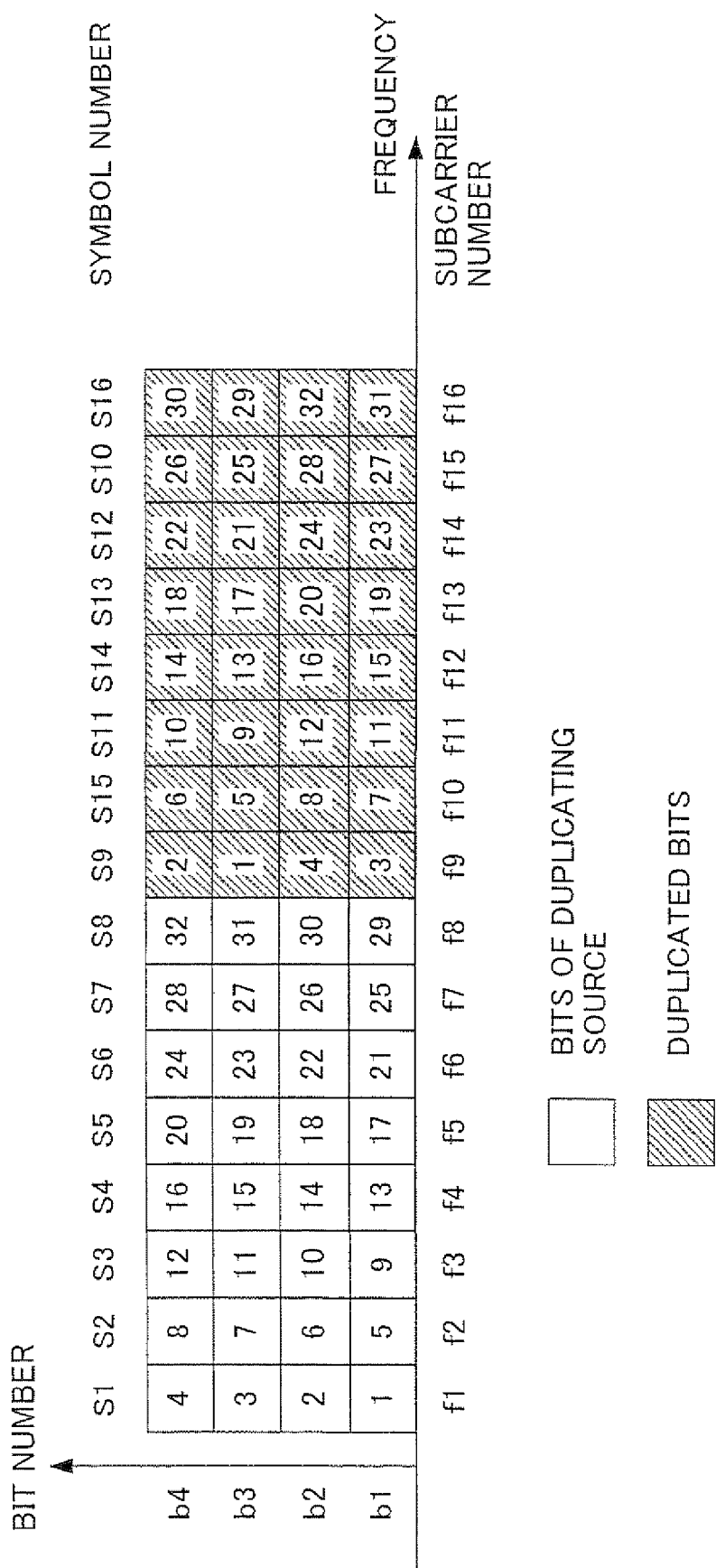
FIG. 22 is a view illustrating a corresponding relationship between a subcarrier and a transmission bit according to Embodiment 4 of the present invention.

Herein, a corresponding relationship between a subcarrier and a transmission bit is illustrated by FIG. 22. For example, attention is paid to symbols S1 and S9 having the same bits. Bits 3 and 4 arranged at higher-order two bits of symbol S1 are arranged at the lower-order two bits of the symbol S9. Also, bits 1 and 2 arranged at lower-order two bits of symbol S1 are arranged at the higher-order two bits of the symbol S9. Accordingly, in symbol S1, the likelihoods of bits 3 and 4 are higher than those of bits 1 and 2. Conversely, in symbol S9, the likelihoods of bits 1 and 2 are higher than those of bits 3 and 4.

Figure 23:
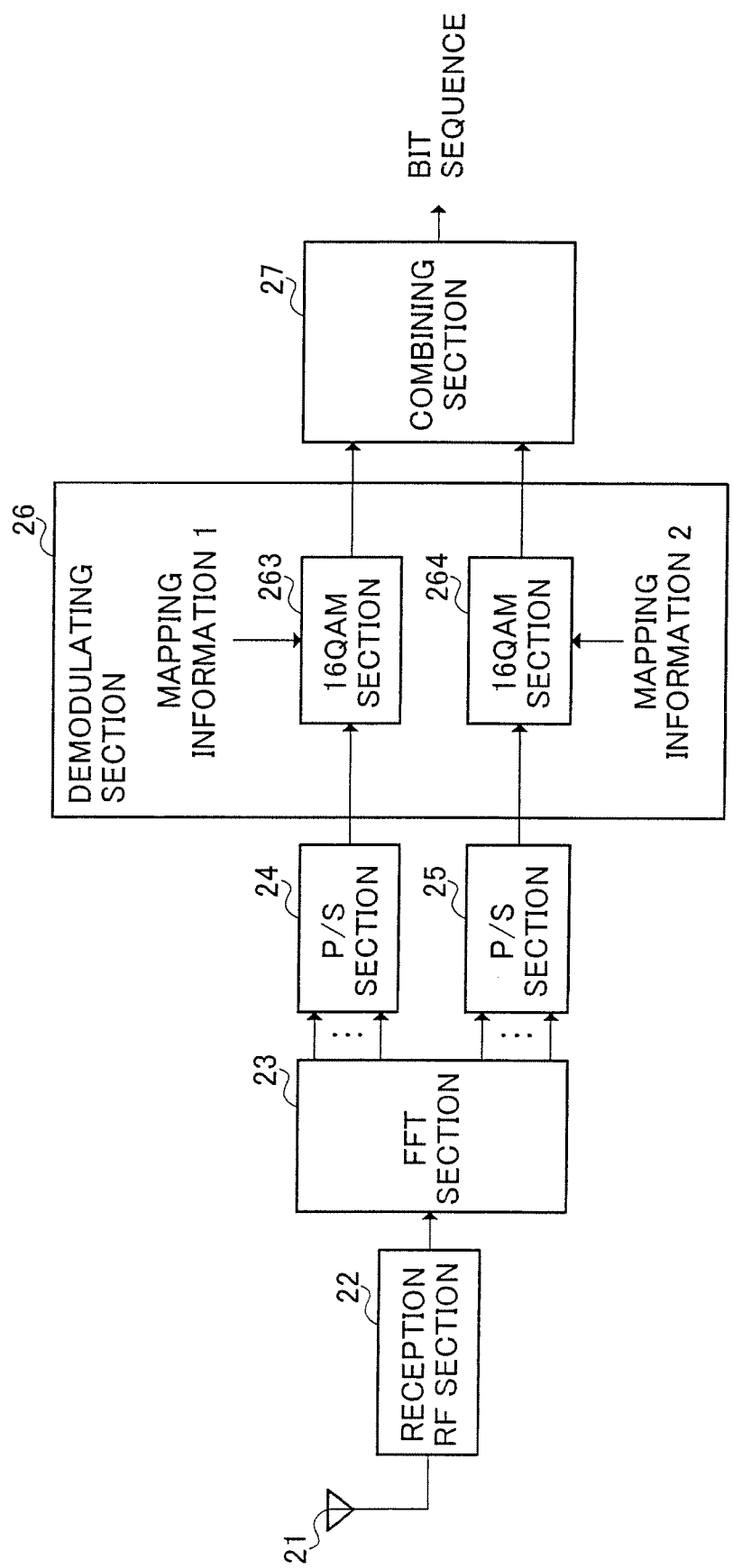
FIG. 23 is a block diagram illustrating a configuration of a radio receiving apparatus according to Embodiment 4 of the present invention.

An explanation will next be given of the radio receiving apparatus. FIG. 23 is a block diagram illustrating a configuration of a radio receiving apparatus according to Embodiment 4 of the present invention. However, the same reference numerals as those of the components (FIG. 2) of Embodiment 1 are added to the same components of Embodiment 1, and the explanation will be omitted. According to the mapping pattern given by mapping information 1 shown in FIG. 20, the 16QAM section 263 demodulates the symbol by use of 16QAM modulation scheme to form a bit sequence. Also, according to the mapping pattern given by mapping information 2 shown in FIG. 21, the 16QAM section 264 demodulates the symbol by use of 16QAM modulation scheme to form a bit sequence.

Figure 24:
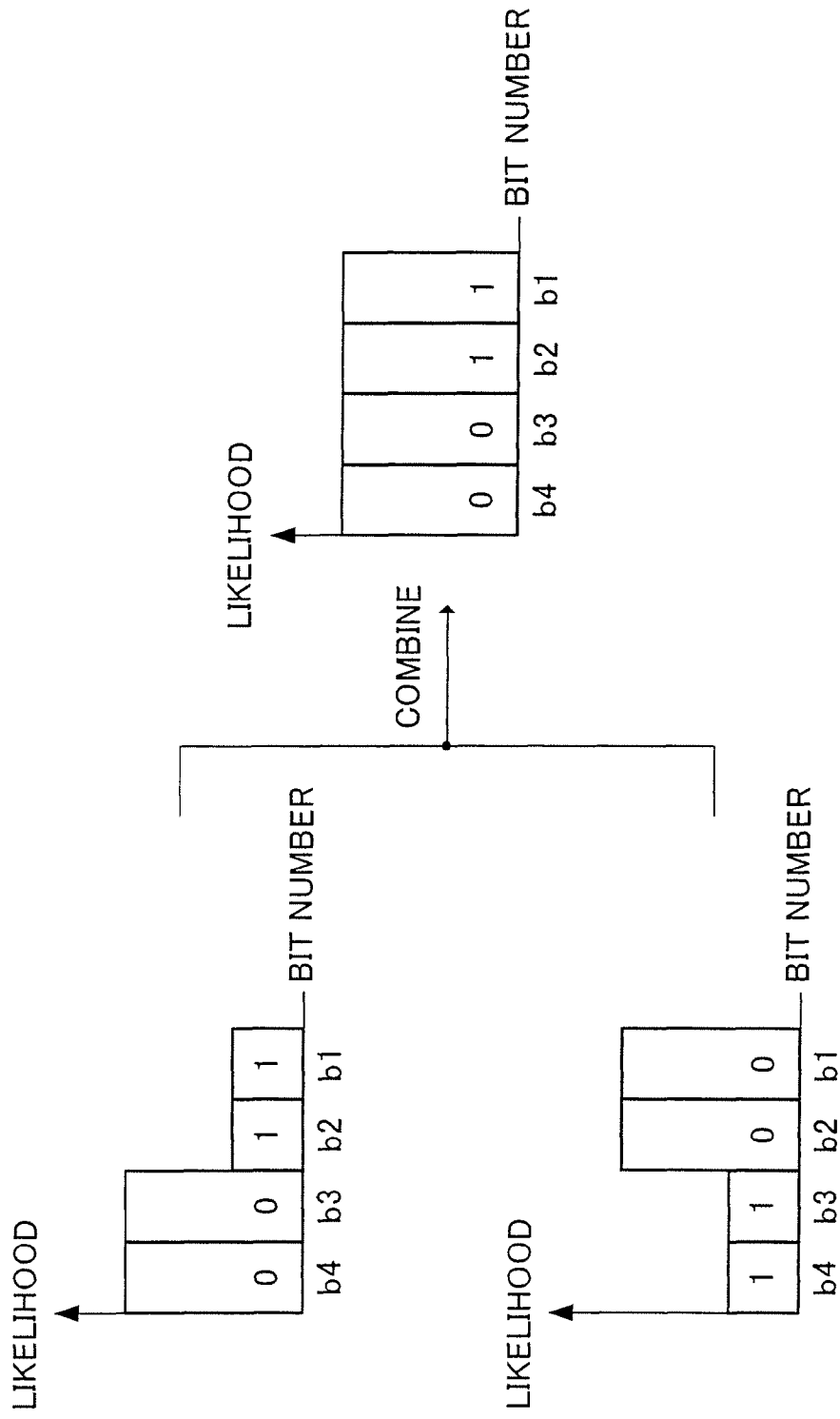
FIG. 24 is a view illustrating a combining method according to Embodiment 4 of the present invention.

The combining section 27 combines the likelihoods of the multiple same bits similar to Embodiment 1. As mentioned above, attention is paid to the mapping point 41. The same bits as "00" with high likelihoods arranged at the higher-order two bits (b4, b3) in FIG. 20 are arranged at lower-order two bits (b2, b1) and the likelihoods are reduced in FIG. 21. Also, the same bits as "11" with low likelihoods arranged at the lower-order two bits (b2, b1) in FIG. 20 are arranged at higher-order two bits (b4, b3) and the likelihoods are increased in FIG. 21. Accordingly, the combining 27 combines the likelihoods of the multiple same bits as illustrated in FIG. 24. Namely, the likelihood of "0" arranged at b4 is combined with that of "0" arranged at b2. The likelihood of "0" arranged at b3 is combined with that of "0" arranged at b1. The likelihood of "1" arranged at b2 is combined with that of "1" arranged at b4. The likelihood of "1" arranged at b1 is combined with that of "1" arranged at b3. This increases the respective bit likelihoods and equalizes them as compared with the case in which combining is not yet made.

As mentioned above, according to the present embodiment, the likelihoods of the multiple same bits each having a different likelihood are combined with each other to enable to increase the likelihoods of the multiple same bits and equalize them, thereby making it possible to more improve the reception quality.

In addition, the radio transmitting apparatus and radio receiving apparatus of the present invention are suitable for use in a radio communication terminal apparatus and a radio communication base station apparatus employed in, for example, a mobile communication system and the like. The radio transmitting apparatus and radio receiving apparatus of the present invention are installed on the radio communication terminal apparatus and the radio communication base station apparatus, thereby enabling to provide the radio transmitting apparatus and radio receiving apparatus having the same functions and effect as mentioned above.

Moreover, the present invention can be applied to a multicarrier CDMA (MC-CDMA) that performs spreading in a frequency axial direction. In the case of this application, since likelihood variation becomes large for each spread code by interference variation between spread codes that is caused by a difference in fading variation for each subcarrier, it can be expected that diversity effect will be more increased.

Furthermore, the present invention can be applied to a multicarrier CDMA (MC/DS-CDMA) that performs spreading in a time axial direction. In the case of this application, regarding a problem in which a signal, which is transmitted by a specific subcarrier, deteriorates extremely by a difference in fading variation for each subcarrier, performance can be improved by diversity effect.

As explained above, according to the present invention, it is possible to improve reception quality without performing transmission and retransmission using a plurality of antennas.

This application is based on the Japanese Patent Application No. 2002-052831 filed on Feb. 28, 2002, entire content of which is expressly incorporated by reference herein.

FIG. 1
BIT SEQUENCE
11: DUPLICATING SECTION
12: MODULATING SECTION
121: 12QAM SECTION
121: 16QAM SECTION
13: S/P SECTION
14: S/P SECTION
15: IFFT SECTION
16: TRANSMISSION RF SECTION
FIG. 2
22: RECEPTION RF SECTION
23: FFT SECTION
24: P/S SECTION
25: P/S SECTION
26: DEMODULATING SECTION
261: 16QAM SECTION
262: 16QAM SECTION
27: COMBINING SECTION
BIT SEQUENCE
FIG. 5
BIT NUMBER
SYMBOL NUMBER
FREQUENCY
SUBCARRIER NUMBER
FIG. 6
BIT NUMBER
SYMBOL NUMBER
FREQUENCY
SUBCARRIER NUMBER
BITS OF DUPLICATING SOURCE
DUPLICATED BITS
FIG. 7
RECEPTION LEVEL
RECEPTION LEVEL
FREQUENCY
SUBCARRIER NUMBER
FIG. 9
RECEPTION LEVEL
FREQUENCY
FIG. 10
BIT SEQUENCE,
11: DUPLICATING SECTION
12: MODULATING SECTION
121: 16QAM SECTION
122: 16QAM SECTION
18: INTERLEAVING SECTION
13: S/P SECTION
14: S/P SECTION
15: IFFT SECTION
16: TRANSMISSION RF SECTION
FIG. 11:
22: RECEPTION RF SECTION
23: FFT SECTION
24: P/S SECTION
25: P/S SECTION
26: DEMODULATING SECTION
28: DEINTERLEAVING SECTION
261: 16QAM SECTION
262: 16QAM SECTION
27: COMBINING SECTION
BIT SEQUENCE
FIG. 12
BIT NUMBER
SYMBOL NUMBER
FREQUENCY
SUBCARRIER NUMBER
BITS OF DUPLICATING SOURCE
DUPLICATED BITS
FIG. 13

BIT NUMBER
SYMBOL NUMBER
FREQUENCY
SUBCARRIER NUMBER
FREQUENCY
SUBCARRIER NUMBER
BITS OF DUPLICATING SOURCE
DUPLICATED BITS
FIG. 14
BIT NUMBER
SYMBOL NUMBER
FREQUENCY
SUBCARRIER NUMBER
BITS OF DUPLICATING SOURCE
DUPLICATED BITS
FIG. 15
BIT SEQUENCE
11: DUPLICATING SECTION
19: INTERLEAVING SECTION
12 MODULATING SECTION
121: 16QAM SECTION
122: 16QAM SECTION
13: S/P SECTION
14: S/P SECTION
15: IFFT SECTION
16: TRANSMISSION RF SECTION
FIG. 16
22: RECEPTION RF SECTION
23: FFT SECTION
24: P/S SECTION
25: P/S SECTION
26: DEMODULATING SECTION
261: 16QAM SECTION
262: 16QAM SECTION
29: DEINTERLEAVING SECTION
27: COMBING SECTION
BIT SEQUENCE
FIG. 17
BIT NUMBER
SYMBOL NUMBER
FREQUENCY
SUBCARRIER NUMBER
BITS OF DUPLICATING SOURCE
DUPLICATED BITS
FIG. 18
BIT NUMBER
SYMBOL NUMBER
FREQUENCY
SUBCARRIER NUMBER
BITS OF DUPLICATING SOURCE
DUPLICATED BITS
FIG. 19
BIT SEQUENCE,
11: DUPLICATING SECTION
12: MODULATING SECTION
121: 16QAM SECTION
124: 16QAM SECTION
MAPPING INFORMATION 1
MAPPING INFORMATION 2
13: S/P SECTION
S/P SECTION
15: IFFT SECTION
16: TRANSMISSION RF SECTION
FIG. 20
MAPPING INFORMATION 1
FIG. 21
MAPPING INFORMATION 2
FIG. 22
BIT NUMBER
SYMBOL NUMBER
FREQUENCY
SUBCARRIER NUMBER
BITS OF DUPLICATING SOURCE
DUPLICATED BITS
FIG. 23
22: RECEPTION RF SECTION
23: FFT SECTION
24: P/S SECTION
25: P/S SECTION
26: DEMODULATING SECTION
MAPPING INFORMATION 1
MAPPING INFORMATION 2
263: 16QAM SECTION
264: 16QAM SECTION
27: COMBINING SECTION
BIT SEQUENCE
FIG. 24
LIKELIHOOD
BIT NUMBER
LIKELIHOOD
BIT NUMBER
COMBINE
LIKELIHOOD
BIT NUMBER

The invention claimed is:

1. A transmitting apparatus that transmits a symbol, the transmitting apparatus comprising:
a modulating section having a signal generator that:
generates a first symbol by modulating first bit information based on a corresponding relationship associating the first bit information with a constellation position, wherein the value of the first bit information is determined based only on whether a power value in one of an I axis direction and a Q axis direction is positive or negative; and
generates a second symbol by modulating the first bit information based on a corresponding relationship associating the first bit information with a constellation position, wherein the value of the first bit information cannot be determined based only on whether a power value in one of the I axis direction and the Q axis direction is positive or negative; and
a transmitting section that performs repetition transmission of the first symbol and the second symbol.

2. The transmitting apparatus according to claim 1, wherein the signal generator of the modulating section:
generates the first symbol by modulating the first bit information and second bit information based on the corresponding relationship: associating the first bit information with the constellation position, wherein the value of the first bit information is determined based only on whether the power value in one of the I axis direction and the Q axis direction is positive or negative; and associating the second bit information with the constellation position, wherein the value of the second bit information cannot be determined based only on whether the power value in one of the I axis direction and the Q axis direction is positive or negative; and
generates the second symbol by modulating the first bit information and the second bit information based on the corresponding relationship: associating the first bit information with the constellation position, wherein the value of the first bit information cannot be determined based only on whether the power value in one of the I axis direction and the Q axis direction is positive or negative; and associating the second bit information with the constellation position, wherein the value of the second bit information is determined based only on whether the power value in one of the I axis direction and the Q axis direction is positive or negative.

3. The transmitting apparatus according to claim 2, wherein:
the first bit information and the second bit information each comprises two bits of information; and
the signal generator of the modulating section generates one symbol from the first bit information and the second bit information using a 16 quadrature amplitude modulation (16QAM) scheme.

4. The transmitting apparatus according to claim 2, further comprising an arranging section that arranges the first symbol and the second symbol in a frequency domain, wherein
the transmitting section simultaneously performs repetition transmission of the first symbol and the second symbol arranged in the arranging section.

5. A transmitting method that transmits a symbol, the method comprising:
generating, with a signal generator of a modulator, a first symbol by modulating first bit information based on a corresponding relationship associating the first bit information with a constellation position, wherein the value of the first bit information is determined based only on whether a power value in one of an I axis direction and a Q axis direction is positive or negative;
generating, with the signal generator of the modulator, a second symbol by modulating the first bit information based on a corresponding relationship associating the first bit information with a constellation position, wherein the value of the first bit information cannot be determined based only on whether a power value in one of the I axis direction and the Q axis direction is positive or negative; and
performing repetition transmission of the first symbol and the second symbol.

* * * * *